(12) United States Patent
Morioka

(10) Patent No.: US 12,238,251 B2
(45) Date of Patent: Feb. 25, 2025

(54) DISPLAY DEVICE AND METHOD FOR CONTROLLING THE SAME

(71) Applicant: SHARP KABUSHIKI KAISHA, Sakai (JP)

(72) Inventor: Hirohito Morioka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/530,735

(22) Filed: Dec. 6, 2023

(65) Prior Publication Data

US 2024/0205342 A1    Jun. 20, 2024

(30) Foreign Application Priority Data

Dec. 16, 2022   (JP) ................................ 2022-201462

(51) Int. Cl.
*H04N 1/00* (2006.01)
*H04N 1/44* (2006.01)

(52) U.S. Cl.
CPC ..... *H04N 1/00437* (2013.01); *H04N 1/00424* (2013.01); *H04N 1/4433* (2013.01); *H04N 2201/0094* (2013.01)

(58) Field of Classification Search
CPC ........... H04N 1/00437; H04N 1/00424; H04N 1/4433; H04N 2201/0094
USPC ....................................................... 358/1.15
See application file for complete search history.

(56) References Cited

U.S. PATENT DOCUMENTS

| | | | | |
|---|---|---|---|---|
| 5,539,530 A | * | 7/1996 | Reifman | H04N 1/32032 358/402 |
| 2002/0133446 A1 | * | 9/2002 | Lee | G06Q 40/04 705/36 R |
| 2006/0061817 A1 | * | 3/2006 | Kakigi | G06F 3/1271 358/1.15 |
| 2006/0171513 A1 | * | 8/2006 | Yoshida | H04N 1/00432 379/88.13 |
| 2010/0157362 A1 | * | 6/2010 | Oomura | G06F 3/1204 358/1.15 |
| 2012/0050806 A1 | * | 3/2012 | Fukuda | G06F 16/93 358/1.15 |
| 2015/0222770 A1 | | 8/2015 | Yoshida | |

FOREIGN PATENT DOCUMENTS

| | | |
|---|---|---|
| JP | 2018-133091 A | 8/2018 |
| JP | 2020-062886 A | 4/2020 |

* cited by examiner

*Primary Examiner* — Allen H Nguyen
(74) *Attorney, Agent, or Firm* — ScienBiziP, P.C.

(57) ABSTRACT

A display device includes one or more processors, one or more memories that store setting information of an executed job as setting history information under control of the one or more processors, and a display. The one or more processors display in the display a first display region for displaying a list of setting history information stored in the one or more memories, a second display region for displaying the setting information based on the setting history information selected by a user from the list display, and a reception button for receiving an instruction to display a setting screen of a job in which the setting information based on the setting history information selected by the user is employed.

11 Claims, 24 Drawing Sheets

FIG. 3

| MANAGEMENT ID | EXECUTION DATE AND TIME | MODE |
|---|---|---|
| 1 | 15:20 JULY 20 | COPY |
| 2 | 14:30 JULY 20 | COPY |
| 3 | 11:32 JULY 20 | SCAN |
| 4 | 15:17 JULY 19 | COPY |
| 5 | 14:50 JULY 19 | COPY |
| 6 | 14:26 JULY 19 | FAX |
| 7 | 13:15 JULY 19 | COPY |
| 8 | 12:10 JULY 19 | FAX |
| 9 | 11:33 JULY 19 | COPY |
| 10 | 10:20 JULY 15 | SCAN |

| HISTORY ID | THE NUMBER OF COPIES | PAPER SELECTION | DOUBLE-SIDED COPYING | STAPLING | PAGE AGGREGATION |
|---|---|---|---|---|---|
| DEFAULT | 1 | AUTOMATIC SELECTION | SINGLE-SIDED→SINGLE-SIDED | OFF | OFF |
| 1 | 1 | TRAY 3 | SINGLE-SIDED→SINGLE-SIDED | OFF | OFF |
| 2 | 10 | AUTOMATIC SELECTION | DOUBLE-SIDED→DOUBLE-SIDED | OFF | OFF |
| 3 | 1 | AUTOMATIC SELECTION | SINGLE-SIDED→SINGLE-SIDED | 1 POINT | 2in1(ORDER OF 2-1) |
| 4 | 1 | AUTOMATIC SELECTION | SINGLE-SIDED→SINGLE-SIDED | OFF | 2in1(ORDER OF 1-2) |
| 5 | 3 | MANUAL FEEDING TRAY | DOUBLE-SIDED→DOUBLE-SIDED | 2 POINTS | OFF |
| 6 | 2 | AUTOMATIC SELECTION | SINGLE-SIDED→DOUBLE-SIDED | OFF | OFF |
| 7 | | | | | |
| 8 | | | | | |
| 9 | | | | | |
| 10 | | | | | |

| 7 | 1 | AUTOMATIC SELECTION | SINGLE-SIDED→DOUBLE-SIDED | 1 POINT | OFF |

| HISTORY ID | DESTINATION | THE NUMBER OF DESTINATIONS | DOUBLE-SIDED COPYING | RESOLUTION | FORMAT |
|---|---|---|---|---|---|
| DEFAULT | NONE | NONE | SINGLE-SIDED | 200×200dpi | PDF |
| 1 | dtest1@aaa.co.jp | 1 | DOUBLE-SIDED HORIZONTAL BINDING | 600×600dpi | JPEG |
| 2 | dtest2@aaa.co.jp<br>dtest3@aaa.co.jp | 2 | SINGLE-SIDED | 300×300dpi | PDF |

| HISTORY ID | DESTINATION | THE NUMBER OF DESTINATIONS | DOUBLE-SIDED COPYING | DENSITY | IMAGE QUALITY |
|---|---|---|---|---|---|
| DEFAULT | NONE | NONE | SINGLE-SIDED | AUTOMATIC | HIGH DEFINITION |
| 1 | 0123445555 | 1 | DOUBLE-SIDED HORIZONTAL BINDING | AUTOMATIC | SUPER HIGH DEFINITION |
| 2 | 0234556666 | 1 | SINGLE-SIDED | LEVEL 4 | HIGH DEFINITION |

| MANAGEMENT ID | EXECUTION DATE AND TIME | MODE | HISTORY ID |
|---|---|---|---|
| 1 | 15:20 JULY 20 | COPY | 6 |
| 2 | 14:30 JULY 20 | COPY | 5 |
| 3 | 11:32 JULY 20 | SCAN | 2 |
| 4 | 15:17 JULY 19 | COPY | 4 |
| 5 | 14:50 JULY 19 | FAX | 2 |
| 6 | 14:26 JULY 19 | COPY | 1 |
| 7 | 13:15 JULY 19 | FAX | 2 |
| 8 | 12:10 JULY 19 | COPY | 1 |
| 9 | 11:33 JULY 19 | COPY | 1 |
| 10 | 10:20 JULY 15 | SCAN | 1 |

| MANAGEMENT ID | EXECUTION DATE AND TIME | MODE | HISTORY ID |
|---|---|---|---|
| 1 | 16:25 JULY 20 | COPY | 7 |
| 2 | 15:20 JULY 20 | COPY | 6 |
| 3 | 14:30 JULY 20 | COPY | 5 |
| 4 | 11:32 JULY 20 | SCAN | 2 |
| 5 | 15:17 JULY 19 | COPY | 4 |
| 6 | 14:50 JULY 19 | COPY | 3 |
| 7 | 14:26 JULY 19 | FAX | 2 |
| 8 | 13:15 JULY 19 | COPY | 2 |
| 9 | 12:10 JULY 19 | FAX | 1 |
| 10 | 11:33 JULY 19 | COPY | 1 |

FIG. 15

| MODE | DISPLAY 1 | DISPLAY 2 | DISPLAY 3 |
|---|---|---|---|
| COPY | PAPER SELECTION | DOUBLE-SIDED COPYING | STAPLING |
| SCAN | DESTINATION INFORMATION | THE NUMBER OF DESTINATIONS | — |
| FAX | DESTINATION INFORMATION | THE NUMBER OF DESTINATIONS | — |

DISPLAY DEVICE AND METHOD FOR CONTROLLING THE SAME

BACKGROUND OF THE INVENTION

Field of the Invention

The present disclosure relates to a display device and the like.

Description of the Background Art

Image forming apparatuses, such as multifunction peripherals, execute jobs based on setting information including values input by users and initial setting values unique to the apparatuses. Some of the image forming apparatuses associate setting information of an executed job and execution history of the job with each other and manage a resultant as setting history information.

The setting history information includes setting information pertaining to execution of the job. Therefore, the job may be reproduced based on the setting history information by employing the setting information as an execution condition of a job to be newly executed.

An image forming apparatus having such a function displays the setting history information on a display device so that the user may select the setting history information. The user selects desired setting history information from among a plurality of pieces of displayed setting history information so as to reproduce a job based on the setting history information.

Regarding the display of setting history information on a display device, a configuration of a recall portal screen provided with a button for calling setting data fixedly set in advance by a user or calling setting data automatically set by a call portal is known. Furthermore, a printer in which the identifiability of setting data is enhanced by displaying an icon of job setting content and a function of the printer on a button for calling the setting data has been used.

The present disclosure relates to an operation of instructing execution of a job based on setting history information, and provides a display device and the like capable of improving operability for users.

SUMMARY OF THE INVENTION

In order to address the above problem, the present disclosure provides a display device including one or more processors, one or more memories that store setting information of an executed job as setting history information under control of the one or more processors, and a display. The one or more processors display in the display a first display region for displaying a list of setting history information stored in the one or more memories, a second display region for displaying the setting information based on the setting history information selected by a user from the list display, and a reception button for receiving an instruction to display a setting screen of a job in which the setting information based on the setting history information selected by the user is employed.

Furthermore, the present disclosure provides a method for controlling a display device having a display including storing setting information of an executed job as setting history information, and displaying the stored setting history information in a first display region in the display as a list, displaying the setting information based on the setting history information selected by a user from the list display, in a second display region in the display, and displaying, in the display, a reception button for receiving an instruction to display a setting screen of a job in which the setting information based on the setting history information selected by the user is employed.

The present disclosure relates to an operation of instructing execution of a job based on setting history information, and may provide a display device and the like capable of improving operability for users.

BRIEF DESCRIPTION OF THE DRAWINGS

FIG. 3 is a diagram illustrating an example of a data structure of a job history management table.

FIG. 4 is a diagram illustrating an example of a data structure of a setting information management table in a copy mode.

FIG. 5A is a diagram illustrating an example of a data structure of a setting information management table in a scan mode. FIG. 5B is a diagram illustrating an example of a data structure of a setting information management table in a fax mode.

FIGS. 6A and 6B are diagrams illustrating examples of a data structure of the setting history management table.

FIG. 15 is a diagram illustrating an operation example according to the first embodiment.

DESCRIPTION OF THE PREFERRED EMBODIMENTS

Figure 1:
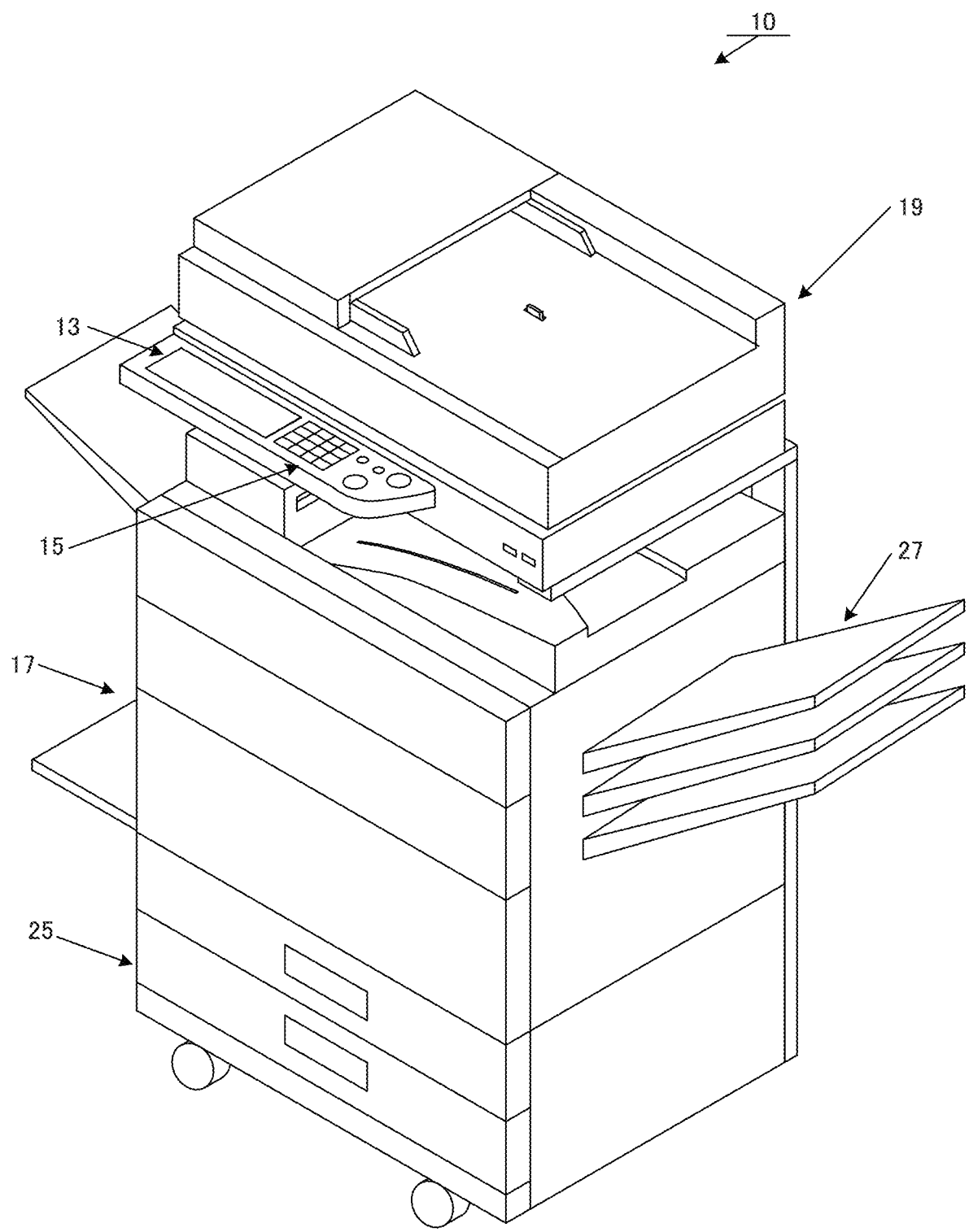
FIG. 1 is a diagram illustrating an overall configuration of a multifunction peripheral according to a first embodiment.

Embodiments of the present disclosure will be described below with reference to the accompanying drawings. Note that the embodiments below are presented as examples for describing the present disclosure, and the technical scope of the description as recited in the appended claims is not limited by the following description.

In general, a user who uses setting history information does not always reuse only setting history information of a most recently executed job. Therefore, it is desirable that a display device stores a plurality of pieces of setting history information of jobs executed in the past. The user is required to select setting history information including setting information to be reused from among a plurality of pieces of stored setting history information. In this case, examples of information for identifying the setting history information desired by the user include a type of operation mode, such as print, copy, scan, fax, or Internet fax (hereinafter, simply referred to as a "mode"), an execution date and time of a job, and actual setting information or the like used to execute the job.

For example, in a case where a date and time of execution of a job is used to select setting history information, the user may select desired setting history information with high accuracy when the user remembers the date and time of execution of the job. However, it is rare that the user remembers the execution date and time of the job, and it is difficult to identify the desired setting history information only by the execution date and time of the job in a case where jobs are executed in rapid succession.

In this case, although the user selects desired setting history information using actual setting information or the like, the user may be required to distinguish setting history information having similar setting information. When a large number of pieces of setting history information are displayed on the screen, unnecessary confusion may be caused.

When a large amount of identification information (for example, a part of information included in setting information, or text or an icon indicating a function, a mode, or the like) of the pieces of setting history information is displayed in order to increase identifiability of setting history information on the screen, sizes of display regions occupied by the display of the respective pieces of setting history information are increased. As a result, it is difficult to simultaneously display all the stored setting history information in a display region, for example, in a list format (hereinafter, referred to as list display where appropriate). In this case, in order to display all the stored setting history information, for example, an operation of updating a display page, such as scrolling of a list portion or page switching, is required, and therefore, there is a problem in that viewability is deteriorated and it is difficult to compare the pieces of setting history information with one another.

On the other hand, in a case where priority is given to display of all the setting history information stored and managed by the display device within one screen, when the display regions occupied by display of the respective pieces of setting history information are sufficiently secured, the number of pieces of setting history information that may be displayed on one screen is reduced. Furthermore, when sizes of the display regions occupied by the display of the respective pieces of setting history information are reduced in order to secure the number of pieces of setting history information to be displayed in limited display region, only a small amount of identification information may be displayed. In this case, since the identifiability of the setting history information is lowered, the user may not easily select desired setting history information in a short time, and there arises a problem in that a long period of time is required before a job corresponding to the setting history information is executed.

The present disclosure relates to an operation of instructing execution of a job based on setting history information, and realize a display device capable of improving operability for users in the following embodiments.

1. First Embodiment

In a first embodiment, a multifunction peripheral (image-forming apparatus) capable of executing jobs in various modes, such as print, copy, scan, fax, and Internet fax, in one housing will be described as an embodiment of a display device. The first embodiment relates to display of setting history information via a home screen serving as a basic screen for receiving an operation instruction input by a user.

1.1 Functional Configuration

Figure 2:
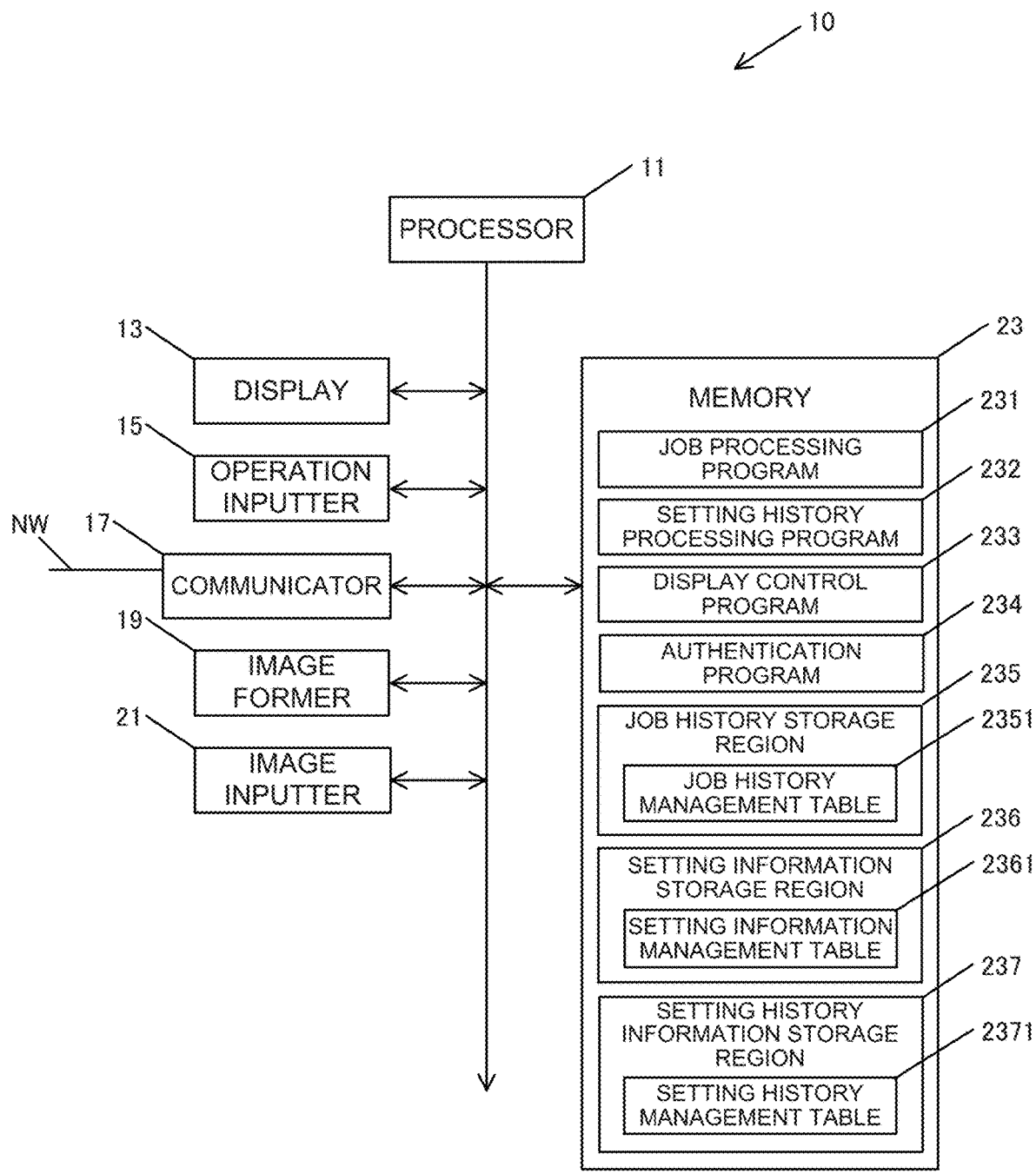
FIG. 2 is a diagram illustrating a functional configuration of the multifunction peripheral according to the first embodiment.

A functional configuration of a multifunction peripheral 10 according to the first embodiment will be described with reference to FIGS. 1 and 2. FIG. 1 is an external perspective view schematically illustrating an overall configuration of the multifunction peripheral 10. FIG. 2 is a diagram illustrating a functional configuration of the multifunction peripheral 10. The multifunction peripheral 10 includes one or more processors 11, a display 13, an operation inputter 15, a communicator 17, an image former 19, an image inputter 21, and one or more memories 23.

The one or more processors 11 control the entire multifunction peripheral 10. The one or more processors 11 include, for example, one or more arithmetic devices (e.g., central processing units (CPUs)). The one or more processors 11 read and execute various programs stored in the one or more memories 23, thereby implementing functions thereof.

The display 13 displays various types of information to a user or the like. The display 13 may be composed of, for example, a liquid crystal display (LCD) or an organic electro-luminescence (EL) display. The display 13 displays a home screen, mode setting screens in the various modes, a history information selection screen to be described below, a history information display region serving as a first display region in the history information selection screen, a detailed information display region serving as a second display region, and the like under control of the one or more processors 11 that have read a display control program 233.

The operation inputter 15 accepts an input of information performed by the user or the like. The operation inputter 15 may include, for example, hard keys (for example, a numeric keypad) and buttons. Note that the operation inputter 15 may be configured as a touch panel that allows input via the display 13. In this case, for example, a common method, such as a resistive method, an infrared method, an electro-magnetic induction method, or a capacitive sensing method, may be employed as an input method of the touch panel.

The communicator 17 includes either one or both of wired and wireless interfaces used for performing communication with other devices via a network NW, such as a local area network (LAN), a wide area network (WAN), the Internet, a telephone line, or a fax line.

The image former 19 forms an image based on image data input through the image inputter 21 on a sheet serving as a recording medium. The image former 19 supplies a sheet from a sheet feeder 25, forms an image based on the image data on the sheet, and thereafter, discharges the sheet to a sheet discharge portion 27. The image former 19 may be composed of, for example, a laser printer employing an electrophotographic method. In this case, the image former 19 forms an image by using toners supplied from toner cartridges (not illustrated) corresponding to toner colors (e.g., cyan, magenta, yellow, and black).

The image inputter 21 may be configured as, for example, a scanner device including an image sensor, such as a charge coupled device (CCD) or a contact image sensor (CIS), an automatic document feeder (ADF), and a flatbed on which a document is mounted. In this case, the configuration of the scanner device is not particularly limited as long as the scanner device is configured to generate image data by reading a reflected light image of a document image with an image sensor. Note that the image inputter 21 may be configured, for example, as an interface capable of acquiring an image data file stored in an external storage device, such as a universal serial bus (USB) memory, or image data transmitted from an external device (not illustrated) via the communicator 17.

The one or more memories 23 store various programs and various data required for operation of the multifunction peripheral 10. The one or more memories 23 may be formed of, for example, a storage device, such as a random access memory (RAM), a hard disk drive (HDD), a solid state drive (SSD), or a read only memory (ROM).

In the first embodiment, the one or more memories 23 store a job processing program 231, a setting history processing program 232, the display control program 233, and an authentication program 234, and ensure a job history storage region 235, a setting information storage region 236, and a setting history information storage region 237.

The job processing program 231 is read by the one or more processors 11 in order to perform processes in the various modes, such as print, copy, scan, fax, Internet fax, and the like for each job. The one or more processors 11 that have read the job processing program 231 execute a job by controlling the display 13, the operation inputter 15, the communicator 17, the image former 19, the image inputter 21, and the like. The one or more processors 11 that have read the job processing program 231 may further execute a job by employing setting information based on setting history information selected by a user as a job execution condition.

The setting history processing program 232 is read by the one or more processors 11 when the one or more processors 11 acquire setting information of an executed job, generate a job history which is history information of the executed job, generate setting history information by associating the setting information with the job history, process the setting history information, and manage a job history management table, a setting information management table, a setting history management table, and the like, for example.

The display control program 233 is read by the one or more processors 11 when the one or more processors 11 perform display control of a display screen through the display 13. The one or more processors 11 that have read the display control program 233 display, on the display 13, for example, a home screen, a mode setting screen for accepting setting information corresponding to a mode of a job and accepting an input of an instruction for executing the job, a login screen for user authentication, and a history information selection screen for accepting selection of setting history information.

The authentication program 234 is read by the one or more processors 11 when the one or more processors 11 authenticate a user who attempts to log into the multifunction peripheral 10. After reading the authentication program 234, the one or more processors 11 function as an authenticator, and when a user authentication function is enabled, the one or more processors 31 displays a login screen, not illustrated, on the display 13 and accepts an input of authentication information of the user authentication. In a case where a combination of a login user name and a login password is used as an authentication condition, the one or more processors 11 may store login user names and login passwords for user authentication which are associated with each other in advance and compares a login user name and a login password which are input through the login screen with the stored login user names and the stored login passwords so as to perform the user authentication. Note that the user authentication may be performed by, for example, property authentication using a token, a key, an integrated circuit (IC) card, a smartphone, or the like, biometric authentication, such as face authentication or fingerprint authentication, in addition to knowledge authentication in which a login user name and a login password are combined. Note that the one or more processors 11 may accept a setting of enabling/disabling of the user authentication function through a system setting screen or the like, not illustrated.

The job history storage region 235 stores execution histories of jobs in the various modes, such as print, copy, scan, fax, and Internet fax. The one or more processors 11 that have read the setting history processing program 232 manage job histories via a job history management table 2351 stored in the job history storage region 235. In the present disclosure, an aspect of management of a maximum of 10 job histories will be described.

The job history management table 2351 will now be described with reference to FIG. 3. FIG. 3 is a diagram illustrating an example of a data structure of the job history management table 2351. The job history management table 2351 includes a management ID, an execution date and time, and a mode as management items. The management ID is an identifier assigned to each job history in order to manage the job history generated when a job is executed. The execution date and time indicates a date and time of execution of a job. The mode indicates a mode of execution of a job.

For example, a management ID "1" represents a job history of a copy mode (mode: "copy") executed on a date and time "15:20 July 20". Note that FIG. 3 is an example in which job histories associated with management IDs "1" to "10" are stored in descending order of execution date and time, and the job history associated with the management ID "1" corresponds to the latest job (a job executed last). Note that each of the job histories according to the present disclosure includes the management ID, the execution date and time, and the mode as history items. However, in addition to these history items, for example, information for specifying a user, such as a name of a user who instructs execution of a job, identification information for identifying the user, and contact information, and other information related to the execution of the job may be included in the history items.

The setting information storage region 236 stores setting information (setting value) employed as a job execution condition. The one or more processors 11 that have read the setting history processing program 232 manage the setting information using a setting information management table 2361 stored in the setting information storage region 236. Note that the setting information to be managed is different among the modes. Therefore, the setting information management table 2361 is prepared for each mode.

Furthermore, as for the number of pieces of setting information managed by the setting information management table 2361 in each mode, the job history managed by the job history management table 2351 may be occupied by one mode, and therefore, as in the case of the job history management table 2351, it is assumed that a maximum of 10 pieces of setting information are managed. Note that the setting information management table 2361 to be described below manages all pieces of setting information required for reproducing a job, but only representative items are illustrated and other items are omitted to facilitate the description.

FIG. 4 is a diagram illustrating an example of a data structure of a setting information management table 2361A in the copy mode. FIG. 5A is a diagram illustrating an example of a data structure of a setting information management table 2361B in the scan mode, and FIG. 5B is a diagram illustrating an example of a data structure of a setting information management table 2361C in the fax mode.

The setting information management table 2361A in the copy mode illustrated in FIG. 4 includes a history ID, the number of copies, paper selection, double-sided copying, stapling, and page aggregation as management items. The history ID is an identifier assigned to identify each setting information in the copy mode. The history ID is used to be referred to by the setting history management table 2371 described below. The number of copies represents the number of copies. The paper selection represents a paper tray for accommodating sheets used for copying. The double-sided copying indicates setting content of the double-sided copying function. The stapling indicates ON/OFF of a staple function as post-processing (the number of binding portions in a case of ON). The page aggregation represents ON/OFF of a page aggregation function (the number of aggregated pages in a case of ON).

For example, a history ID "1" is an example of setting information when the number of copies performed on paper supplied from "tray 3" (paper selection) is "1" (the number of copies), and is an example of setting information including a double-sided copying function "single-sided to single-sided", a stapling function "OFF", and a page aggregation function "OFF" as setting values.

Note that a history ID "default" represents setting information when an execution condition of a job in the copy mode is an initial condition. In FIG. 4, the setting information corresponding to "default" is also managed in the setting information management table 2361A, but the setting information corresponding to "default" is not required to be managed in the setting information management table 2361A and may be managed in another storage region.

The setting information management table 2361B in the scan mode illustrated in FIG. 5A includes a history ID, a destination, the number of destinations, double-sided printing, a resolution, and a format as management items. The history ID is an identifier assigned to identify each setting information in the scan mode. The destination represents a transmission destination (for example, an e-mail address) of image data generated by a scanner device or the like. The number of destinations represents the number of transmission destinations. The double-sided printing indicates a reading surface setting of documents, and the resolution indicates a reading resolution in document reading. The format represents a format of image data to be generated or transmitted.

For example, a history ID "1" indicates an example of setting information when the number of destinations is one, that is, only an address "dtest1@aaa.co.jp", and is an example of the setting information including reading side (double-sided printing) of "double-sided horizontal binding", a reading resolution (resolution) of "600×600 dpi", and the format "JPEG" as setting values.

The setting information management table 2361C in the fax mode illustrated in FIG. 5B includes a history ID, a destination, the number of destinations, double-sided printing, density, and image quality as management items. The history ID is an identifier assigned to identify each setting information in the fax mode. The destination represents a transmission destination (for example, a fax number) of image data generated by a scanner device or the like. The number of destinations represents the number of transmission destinations. The double-sided printing indicates a reading surface setting of documents, and the density indicates reading density in document reading. The image quality represents image quality of image data (fax data) to be generated or transmitted.

For example, a history ID "1" indicates an example of setting information when the number of destinations is one, that is, only a destination "0123445555", and is an example of the setting information including reading side (double-sided printing) of "double-sided horizontal binding", reading density (density) of "automatic", and the image quality "super high definition" as setting values.

Referring back to FIG. 2, the setting history information storage region 237 stores setting history information generated by associating a job history with setting information employed as a job execution condition. The one or more processors 11 that have read the setting history processing program 232 manage the setting history information using a setting history management table 2371 stored in the setting history information storage region 237. Note that, since the same number of pieces of setting history information as those of job histories to be associated are generated, a maximum of 10 pieces of setting history information may be managed, and this form is described in the present disclosure. Furthermore, the number of pieces of setting history information managed in the setting history management table 2371 is determined as the total number of pieces of setting history information in the modes. That is, according to the present disclosure, the total number of pieces of setting history information in the modes is managed to be 10 at maximum.

The setting history management table 2371 will now be described below with reference to FIG. 6A. FIG. 6A is a diagram illustrating an example of a data structure of a setting history management table 2371A. The setting history management table 2371A is configured such that a history ID for referring to associated setting information (refer to the setting information management table 2361 in FIGS. 4 and 5) is added as a management item to the structure of the job history management table 2351 described with reference to FIG. 3. Note that, when the setting history management table 2371A described here and a setting history management table 2371B described below are not required to be distinguished from each other, the setting history management tables 2371A and 2371B are simply referred to as a setting history management table 2371.

For example, a management ID "1" is an example of the setting history information in which setting information identified by a history ID "6" illustrated in FIG. 4 is associated with a job history in the copy mode (mode: "copy") executed at a date and time "15:20 July 20".

Similarly, a management ID "3" is an example of the setting history information in which setting information identified by a history ID "2" illustrated in FIG. 5A is associated with a job history in the scan mode (mode: "scan") executed at a date and time "11:32 July 20".

Similarly, a management ID "6" is an example of the setting history information in which setting information identified by a history ID "2" illustrated in FIG. 5B is associated with a job history in the fax mode (mode: "fax") executed at a date and time "14:26 July 19".

1.2 Processing Flow

The multifunction peripheral 10 according to the present disclosure does not store and manage setting history information having the same setting information in a duplicated manner.

Furthermore, when the number of pieces of setting history information to be stored exceeds the number of pieces that can be managed by the setting history management table 2371, oldest setting history information in the history is deleted. By performing the process of updating the setting history information stored and managed in the setting history management table 2371 in this way, it is possible to prevent unnecessary storage and management of surplus setting history information and setting history information whose history is old and whose use frequency is estimated not to be so high.

Figure 7:
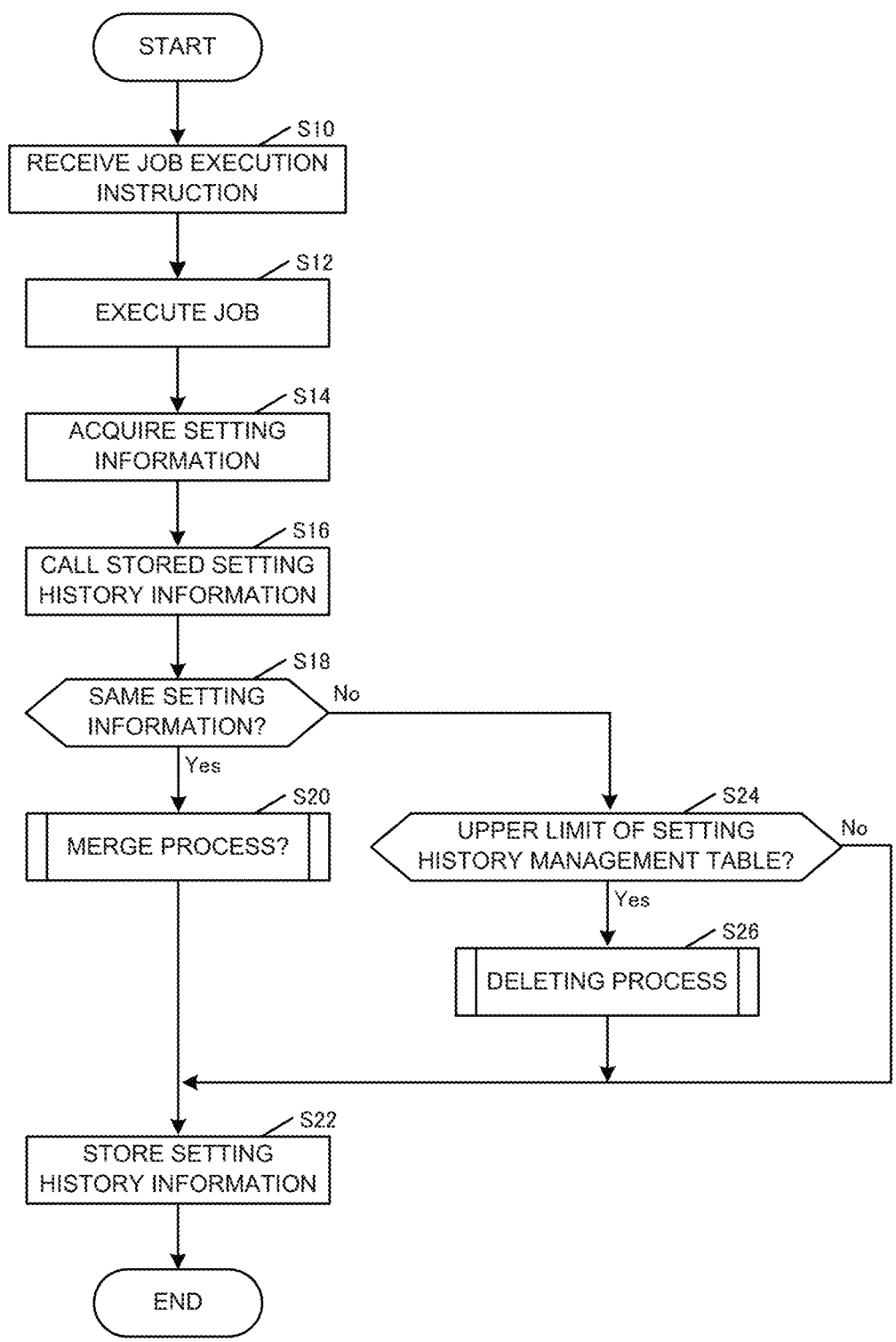
FIG. 7 is a flowchart of a process according to the first embodiment.

FIG. 7 is a flowchart for explaining the process of updating the setting history management table 2371. The process described with reference to FIG. 7 is executed when the one or more processors 11 mainly read the job processing program 231, the setting history processing program 232, the display control program 233, and the like.

The one or more processors 11 receive a job execution instruction via a mode setting screen, a history information selection screen, or the like (step S10).

When receiving the job execution instruction, the one or more processors 11 execute a job (step S12). Then, the one or more processors 11 acquire setting information for the job execution (step S14).

Subsequently, the one or more processors 11 call setting history information which has been stored in the setting history management table 2371A, and compare the setting information acquired in step S14 with setting information included in the setting history information called from the setting history management table 2371A (from step S16 to step S18).

As a result of the comparison of the setting information, when it is determined that the setting information is the same, the one or more processors 11 performs a process of merging the setting information (from step S18: Yes to step S20). Then the one or more processors 11 store setting history information based on the merged setting information in the setting history management table 2371A, and terminate the process (step S22).

Here, the one or more processors 11 may determine a case where all the setting values included in the setting information completely match as "the setting information is the same" or may determine a case where a predetermined number or more of setting values match as "the setting information is the same". In this case, a setting value (for example, the number of copies, a destination (an e-mail address or a facsimile number), or the like) that is considered to be likely to be changed by the user may be excluded from the setting values to be compared and determined. The items of the setting values to be compared may be appropriately set and changed by the user.

On the other hand, when it is determined that the setting information is not the same, the one or more processors 11 determine whether the number of pieces of setting history information (stored number) managed in the setting history management table 2371A has reached an upper limit number (step S18; No→step S24).

When it is determined that the number of pieces of setting history information managed in the setting history management table 2371A has reached the upper limit number, that is, when it is determined that the number of pieces of setting history information stored in the setting history management table 2371A has reached 10, the one or more processors 11 delete setting history information having an oldest date and time stored in the setting history management table 2371A (step S24; Yes→step S26).

Then the one or more processors 11 store setting history information based on the setting information acquired in step S14 (step S22), update the setting history management table 2371A to the setting history management table B illustrated in FIG. 6B, and terminate the process. On the other hand, when it is determined that the number of pieces of setting history information managed in the setting history management table 2371A has not reached the upper limit, the one or more processors 11 store the setting history information based on the setting information in the setting history management table 2371A, and terminate the process (step S24: No→step S22).

Figure 8:
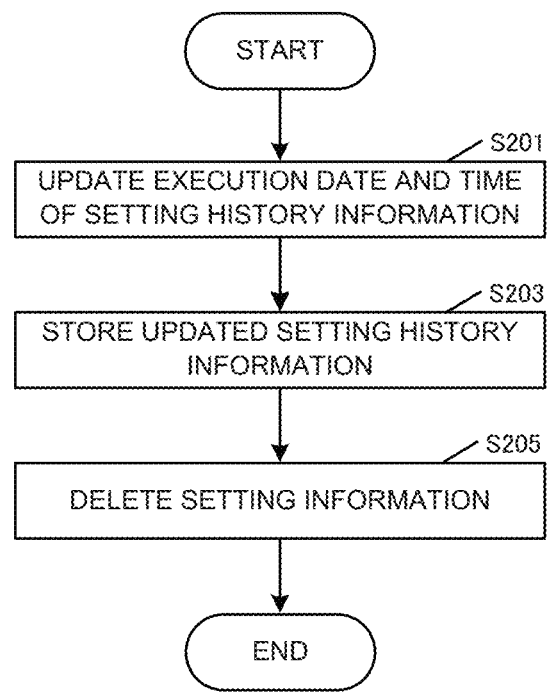
FIG. 8 is a flowchart of a process according to the first embodiment.

FIG. 8 is a flowchart of the merging process executed by the one or more processors 11 when it is determined that the setting information is the same as a result of the comparison of the setting information performed in step S18 of FIG. 7. FIG. 8 is a flowchart of a process of updating an execution date and time (storage date and time) of setting history information managed in the setting history management table 2371 to an execution date and time of a job when it is determined that the setting information is the same.

When the one or more processors 11 determine that the setting information is the same as a result of the comparison of the setting information in step S18 of FIG. 7, the one or more processors 11 update the execution date and time of the setting history information to be compared, which is managed in the setting history management table 2371A, to the execution date and time of the job for the setting information acquired in step S14 (step S201).

Then the one or more processors 11 store the setting history information corresponding to the updated execution date and time in the setting history management table 2371 (step S203). With the update of the execution date and time, the setting history information is stored and managed as latest setting history information. At this time, when there are management IDs having values (i.e., new execution date and times) smaller than the management ID to be compared, the values of the management IDs are reduced by one so that a value of the management ID to be compared is updated to "1".

Thereafter, the one or more processors 11 delete the setting information acquired in step S14, and terminate the process (step 205).

Note that, as a result of the comparison of the setting information in step S18 of FIG. 7, when it is determined that the setting information is the same, the one or more processors 11 may generate setting history information based on the setting information of the executed job and delete the setting history information already stored in the setting history management table 2371.

In addition, as a result of the comparison of the setting information in step S18 of FIG. 7, when it is determined that the setting information is the same, the one or more processors 11 may allow the setting history information of the newly executed job and the setting history information of the existing setting information to coexist. In this case, the setting history information of the newly executed job is newly added, and the existing setting history information also remains without being deleted. The existing setting history information may be deleted when it is determined that the number of pieces of setting history information managed in the setting history management table 2371A reaches the upper limit number.

Figure 9:
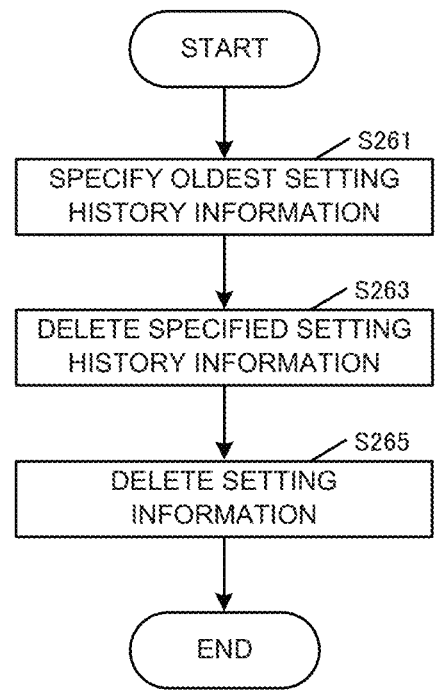
FIG. 9 is a flowchart of a process according to the first embodiment.

FIG. 9 is a flowchart for explaining a deletion process executed by the one or more processors 11 when the setting information is not the same as a result of the comparison of the setting information in step S18 of FIG. 7 (step S18; No) and it is determined that the number of setting history information managed in the setting history management table 2371A reaches the upper limit (step S24; Yes).

The one or more processors 11 specify setting history information which has an oldest date and time and which is stored in the setting history management table 2371A among the setting history information managed by the setting history management table 2371A (step S261).

Then the one or more processors 11 delete the specified setting history information from the setting history management table 2371A (step S263). Then the one or more processors 11 delete setting information corresponding to the deleted setting history information from the setting information management table 2361A, and terminate the process (step S265).

Figure 10:
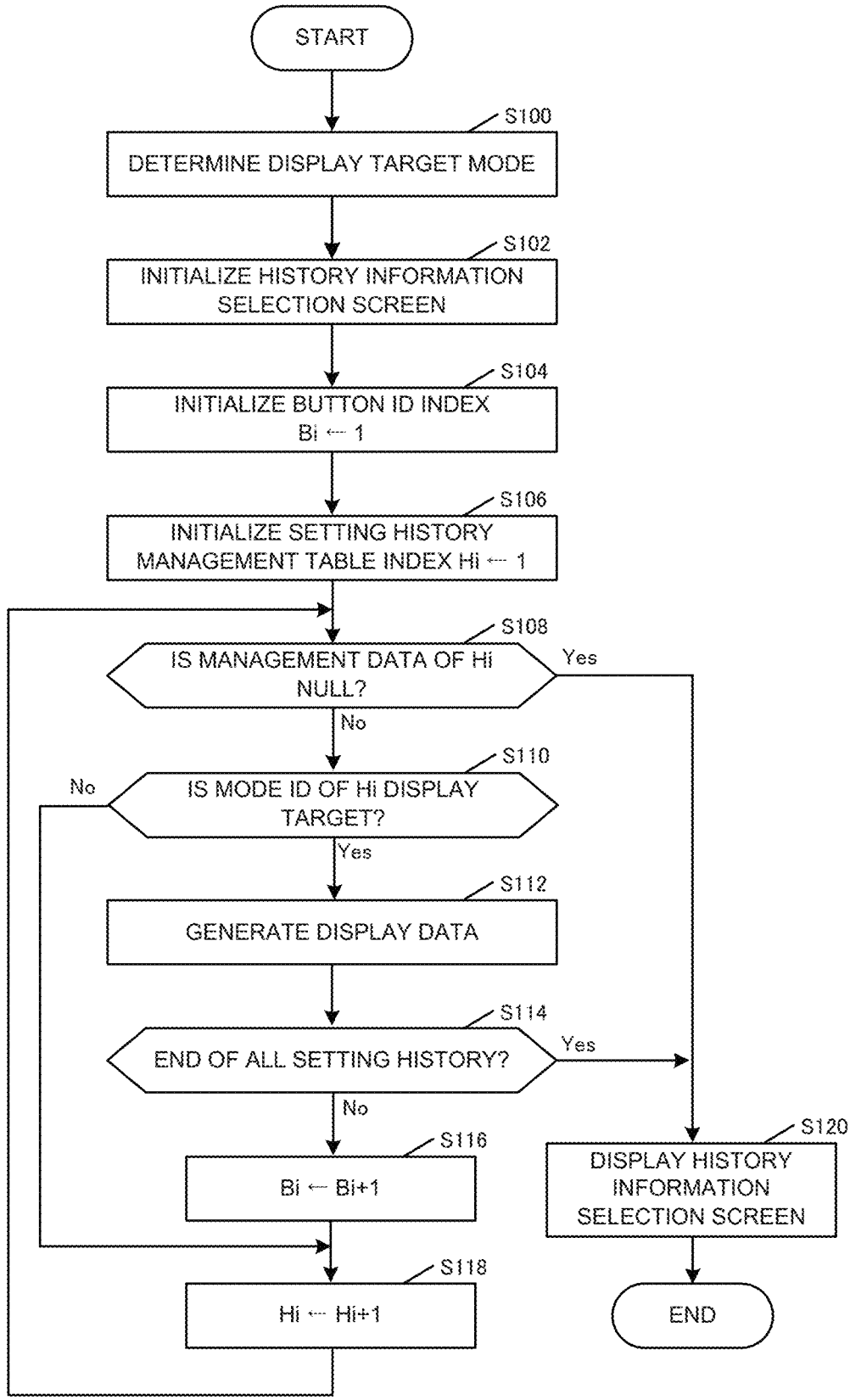
FIG. 10 is a flowchart of a process according to the first embodiment.

Next, a process of displaying setting history information on a history information selection screen (process of generating a setting history information list screen) will be described with reference to FIG. 10.

On the history information selection screen according to the present disclosure, it is possible to narrow down and display the setting history information for each mode. Specifically, the history information selection screen includes mode selection tabs that allow a display selection of the setting history information for each mode. By selecting one of the mode selection tabs, the user can narrow down the setting history information to be displayed on the history information selection screen according to the mode.

First, the one or more processors 11 determine a display target mode in accordance with a selection state of the mode selection tabs by the user (step S100).

After determining the display target mode, the one or more processors 11 initialize the history information selection screen (step S102). Subsequently, the one or more processors 11 initialize an index (counter) Bi of a button ID for the display process (step S104). The one or more processors 11 also initialize a management table index (counter) Hi of the setting history management table 2371 (step S106).

Thereafter, the one or more processors 11 determines whether a value of the management table index Hi is NULL (step S108). When the value of the management table index Hi is not NULL, the one or more processors 11 determine whether the mode ID of the management table index Hi is the display target mode (step S108; No→step S110).

When the setting history information referred to by the management table index Hi is in the display target mode, the one or more processors 11 generate display data representing the setting history information to be displayed (step S110; Yes→step S112). Note that the display data includes a job mode and an execution date and time, and these values can be acquired from the setting history management table 2371.

When the determination is performed on all the pieces of setting history information managed in the setting history management table 2371, the one or more processors 11 displays the history information selection screen on the display 13 (step S114; Yes→step S120).

On the other hand, when the determination has not been completed for all the setting history information managed in the setting history management table 2371, the one or more processors 11 increment the value of the index Bi of the button ID (step S114; No→step S116). Thereafter, the one or more processors 11 also increment the value of the management table index Hi (step S118), and returns the process to step S108.

Note that, when the value of the management table index Hi is NULL, the one or more processors 11 displays the history information selection screen on the display 13 (step S108; Yes→step S120).

In addition, when the setting history information referred to by the management table index Hi is not the display target mode, the one or more processors 11 omit the process from step S112 to step S116, and proceeds to step S118 (step S110; No→step S118).

1.3 Operation Example

Next, an operation example according to the first embodiment will be described.

1.3.1 Operation of Updating Setting History Management Table 2371

First, an example of an operation of storing setting history information generated by execution of a job will be described with reference to FIGS. 4, 5, 6, 7, and 9.

Before the description of the operation example, it is assumed that a job in the copy mode with the following setting information is executed: the number of copies "1"; a paper selection "automatic selection"; a double-sided copying function "single-sided→double-sided", a staple function "1 portion", and a page aggregation function "OFF". Note that the description will be made on the assumption that a job based on the same setting information as the setting information related to the execution of the job has not been executed so far, and setting history information based on the setting information is not stored in the setting history management table 2371.

After determining that the setting information in the execution of the job is not the same as the setting information included in the setting history information called from the setting history management table 2371A, the one or more processors 11 newly add a history ID to the setting information related to the execution of the job and stores the setting information in the setting information management table 2361A. For example, as illustrated in FIG. 4, the one or more processors 11 add an unallocated history ID "7" to the setting information related to the execution of the job and stores the setting information in the setting information management table 2361A. When the number of pieces of setting information stored in the setting information management table 2361A has already reached 10, a history ID to be allocated does not exist in the setting information management table 2361A. In the setting information management table 2361A, it is not possible to determine the oldest setting information to be overwritten. In this case, the one or more processors 11 can specify a history ID of an oldest job by referring to the setting history management table 2371A.

Then the one or more processors 11 determine whether the number of pieces of setting history information managed in the setting history management table 2371A has reached the upper limit (refer to FIG. 7).

When the number of pieces of setting history information managed in the setting history management table 2371A is 10 as illustrated in FIG. 6A, for example, the one or more processors 11 deletes setting history information having the oldest date and time stored in the setting history management table 2371A (refer to FIG. 9). That is, the one or more processors 11 delete the setting history information in the scan mode corresponding to the management ID "10" illustrated in FIG. 6A and setting information corresponding to the history ID "1" illustrated in FIG. 5A.

Then the one or more processors 11 assign a management ID "1" to the setting information (history ID "7") in the executed copy mode, and shift the setting history information of the setting history management table 2371A downward by one. Then the one or more processors 11 insert the setting information (history ID "7") in the executed copy mode in a portion corresponding to the generated management ID "1" and store the setting information as the setting history management table 2371B (FIG. 6B).

1.3.2 Operation of Displaying Setting History Information on Home Screen

Figure 11:
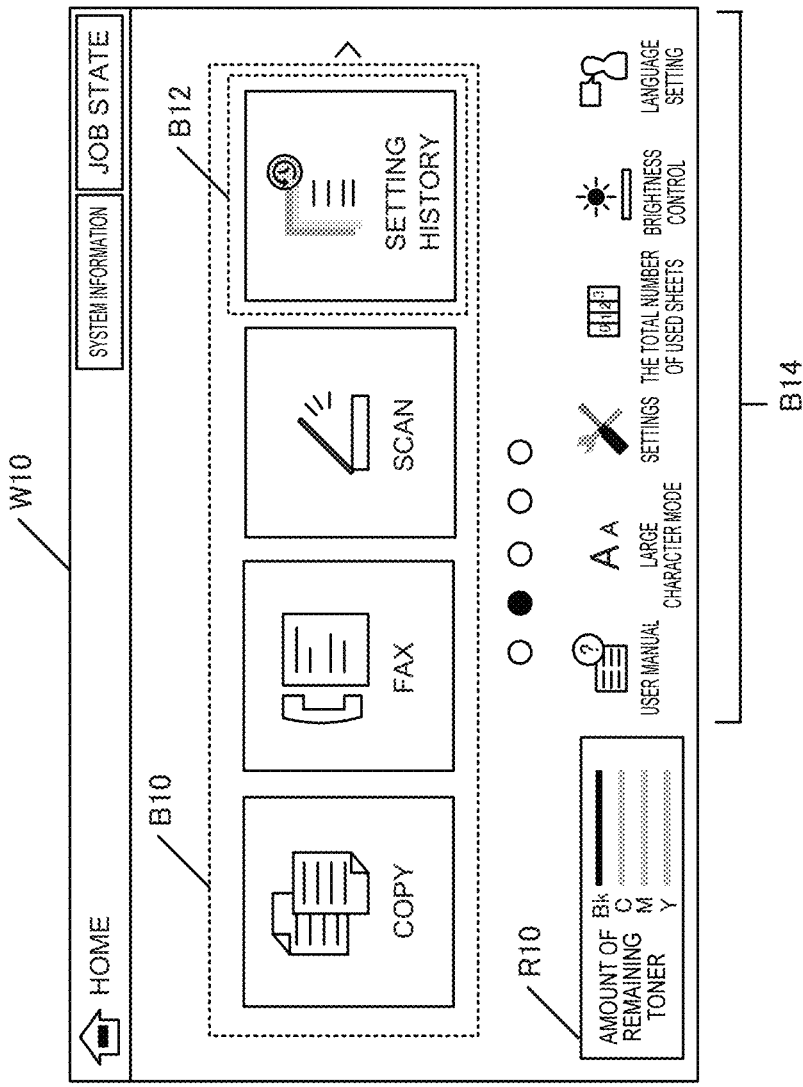
FIG. 11 is a diagram illustrating an operation example according to the first embodiment.

FIG. 11 is a diagram illustrating an example of a configuration of a home screen W10 displayed on the display 13 by the multifunction peripheral 10. A home screen W10 is a basic screen that is displayed on the display 13 when power is turned on, when a standby mode is entered, or when restoration is performed from a sleep mode, or the like, and accepts an operation input performed by the user. The home screen W10 includes mode selection buttons B10, a device state display region R10, and function selection buttons B14.

The mode selection buttons B10 are input buttons that accept instructions for executing jobs in the print, copy, scan, fax, and Internet fax modes and the like. When accepting a selection of one of the mode selection buttons B10, the one or more processors 11 display a mode setting screen or the like corresponding to the mode. The mode selection buttons B10 include a setting history button B12 in addition to selection buttons for the individual modes. When receiving a selection of the setting history button B12, the one or more processors 11 display a history information selection screen to be described hereinafter with reference to FIG. 12.

The function selection buttons B14 are input buttons for accepting a change instruction, a reference instruction, and the like associated with a function setting of the multifunction peripheral 10. When the selection of any one of the function selection buttons B14 is received, the one or more processors 11 display setting screens (not illustrated) for executing a change instruction, a reference instruction, and the like for a function corresponding to the selected button.

The device state display region R10 displays a device state of the multifunction peripheral 10. FIG. 11 is a diagram illustrating an example in which an amount of remaining toner is displayed in the device state display region R10.

Figure 12:
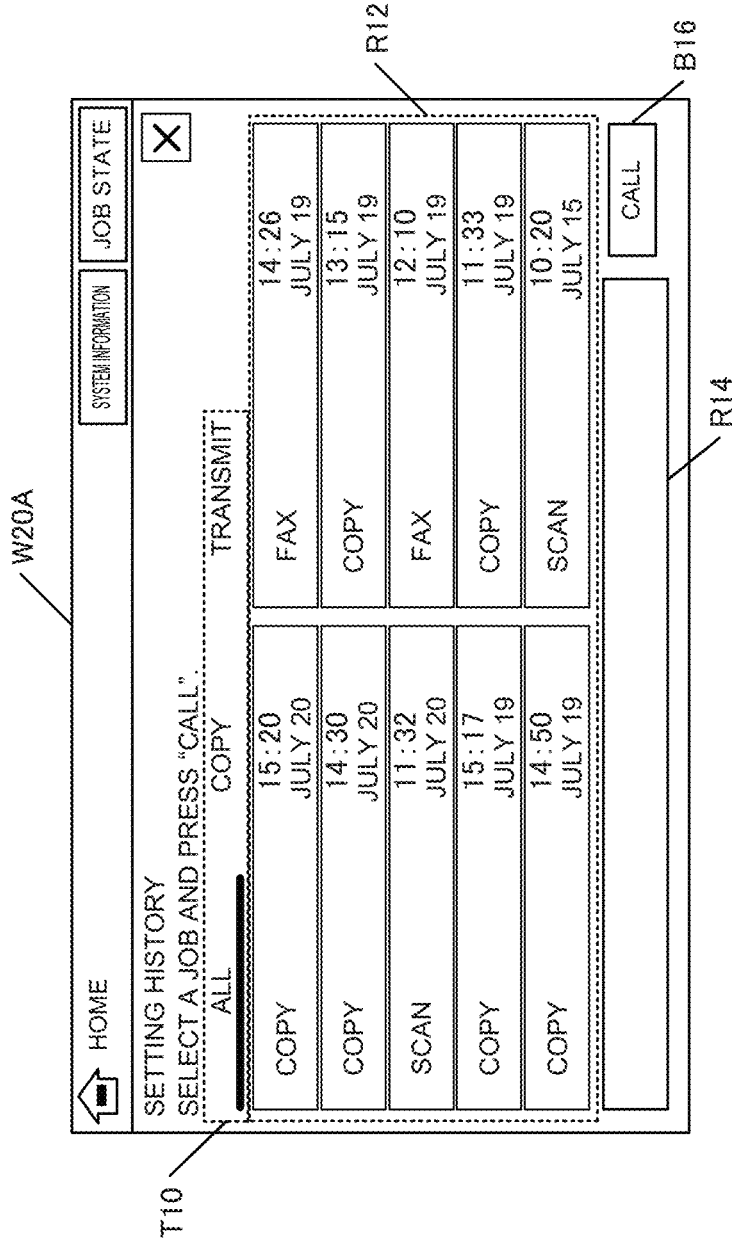
FIG. 12 is a diagram illustrating an operation example according to the first embodiment.

FIG. 12 is a diagram illustrating a configuration example of a history information selection screen W20A displayed by the one or more processors 11 on the display 13 when an instruction for selecting the setting history button B12 on the home screen W10 illustrated in FIG. 11 is received. The history information selection screen W20A includes a history information display region R12 serving as a first display region, a detailed information display region R14 serving as a second display region, display mode selection tabs T10, and a call button B16.

The history information display region R12 displays the setting history information managed by the setting history management table 2371. Note that FIG. 12 is an example in which the setting history information managed by the setting history management table 2371A illustrated in FIG. 6A is displayed in the history information display region R12. The history information display region R12 includes independent display regions (hereinafter, referred to as list regions where appropriate) for displaying respective pieces of setting history information. The history information display region R12 includes a number of list regions capable of displaying a list of all the pieces of setting history information managed by the setting history management table 2371A. The maximum number of pieces of setting history information managed in the setting history management table 2371A illustrated in FIG. 6A is 10. Therefore, the history information display region R12 includes list regions capable of displaying a maximum of 10 pieces of setting history information.

Note that the list regions in the history information display region R12 are arranged in the descending order of execution date and times of jobs from an upper left side to a lower left side and then from an upper right side to a lower right side in the drawing. Note that, for convenience of description, the arrangement order from the left side to the lower right side in the drawing may be referred to as the first (#1) to the tenth (#10).

Furthermore, the settings of the content of the display items of the setting history information displayed in the list regions, the number of display items, and the like are not particularly limited. The display settings in the individual list regions may be made in consideration of, for example, the number of displayable items in the history information display region R12, display balance in the list regions, and the like, and content displayed in the list regions is not limited as long as the user can recognize the individual pieces of setting history information displayed in the list regions. In FIG. 12, a mode name (copy, scan, or fax) of an executed job and an execution date and time of the job are displayed in each of the list regions as display content, for example.

The detailed information display region R14 is a display region for displaying details of setting information corresponding to setting history information selected by the user. Note that a specific form of the setting information displayed in the detailed information display region R14 will be described later.

The display mode selection tabs T10 accepts a selection for narrowing down display target modes of the setting history information. The display mode selection tabs T10 include a tab "all", a tab "copy", and a tab "transmit". The tab "all" accepts a selection of setting history information of all the modes as display targets. The tab "copy" accepts a selection of only setting history information of the copy mode as display targets. The tab "transmit" accepts a selection of setting history information of the scan mode and the fax mode as display targets. In FIG. 12, the tab "all" is selected from the display mode selection tabs T10, and all the pieces of setting history information managed in the setting history management table 2371A are displayed, for example.

The call button B16 is an acceptance button for accepting an instruction for calling a setting screen (mode setting screen) of a job to which the setting information of the setting history information displayed in each of the list regions is applied. When the setting history information to be called is specified by the user and the call button B16 is selected, the one or more processors 11 display the mode setting screen in which the setting information of the specified setting history information is employed as the job execution condition.

Figure 13:
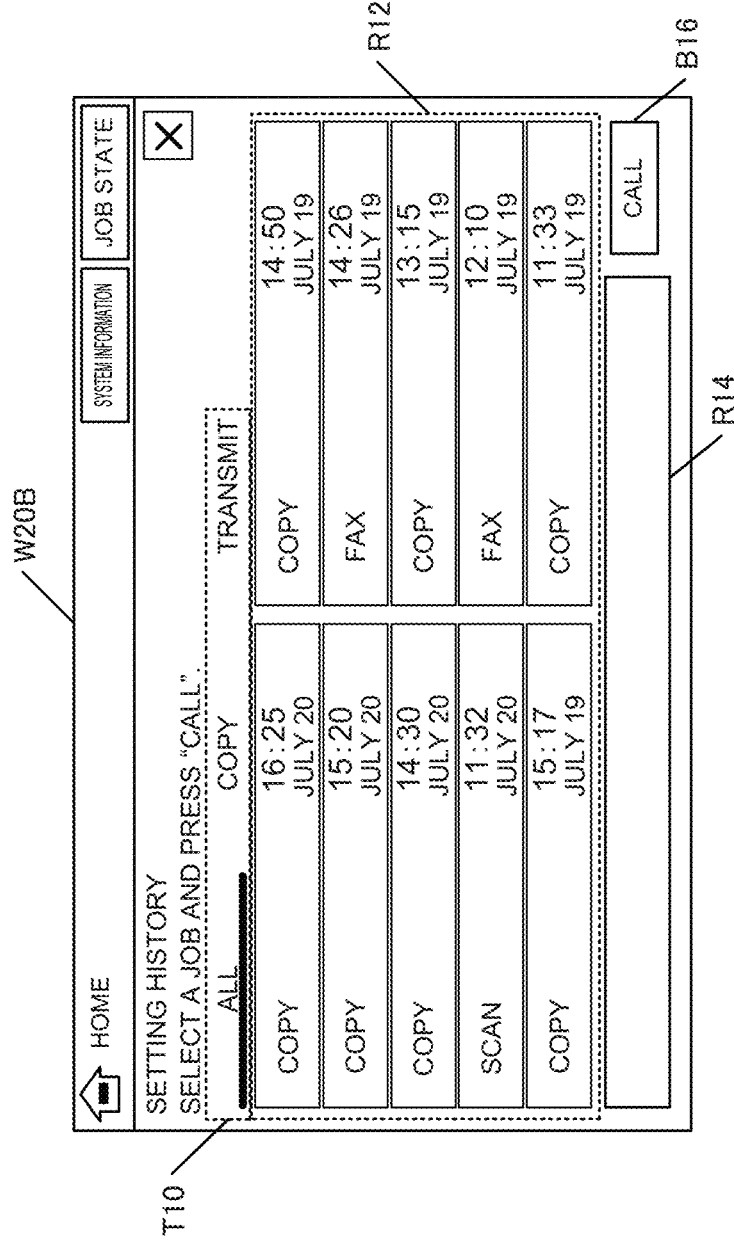
FIG. 13 is a diagram illustrating an operation example according to the first embodiment.

Note that, in FIG. 13, the setting history information managed by the setting history management table 2371B illustrated in FIG. 6B is displayed in the history information display region R12 of the history information selection screen W20B as an example. Along with the update from the setting history management table 2371A illustrated in FIG. 6A to the setting history management table 2371B illustrated in FIG. 6B, the setting history information based on the history ID "7" is displayed at a position of the management ID "1" (the first in the list region), and the setting history information positioned at the management ID "10" (the tenth in the list region) on the history information selection screen W20A is deleted from the history information selection screen W20B.

Figure 14:
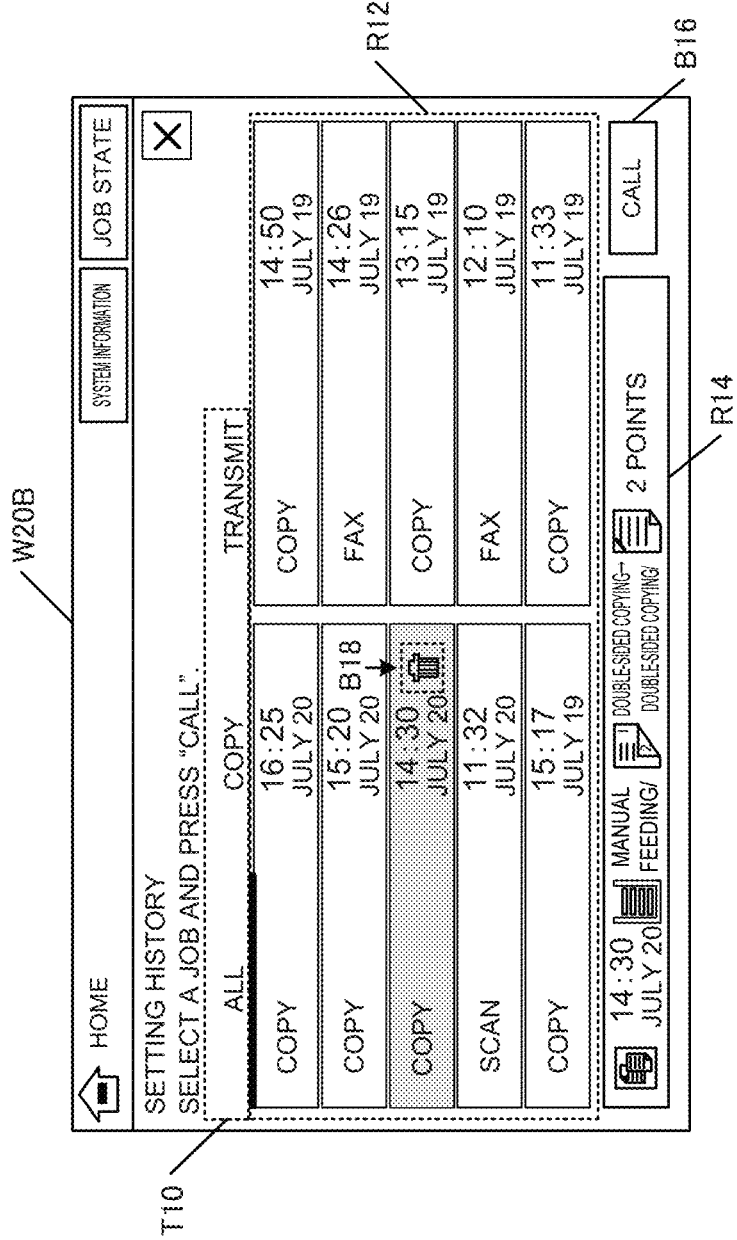
FIG. 14 is a diagram illustrating an operation example according to the first embodiment.

FIG. 14 is a diagram illustrating a change in a display state when the setting history information displayed in a third list region is selected by the user on the history information selection screen W20B illustrated in FIG. 13. In the following description, it is assumed that the third list region displays setting history information for a copy mode job.

Upon receiving an instruction for selecting the third list region from the user, the one or more processors 11 notify the user that the list region has been selected by, for example, displaying the selected list region in a dark color. In this case, as long as the setting history information (list region) of the accepted selection instruction can be displayed identifiable by the user, for example, display of a check mark, a specific icon, or the like, highlighted display in a display color different from that of the darkened display, a change in a display font or a display size, or the like may be used instead of the darkened display. Furthermore, as illustrated in FIG. 14, in response to the selection of the list region, a delete button B18 for receiving an instruction for hiding the setting history information, deleting the setting history information from the setting history management table 2371B, or deleting the setting information from the setting information management table 2361A may also be displayed.

At this time, the one or more processors 11 display content (setting values) of the setting information of the setting history information selected by the user in the detailed information display region R14 as detailed information. In the detailed information display region R14, a mode icon indicating a mode of an executed job, an execution date and time of the job, and setting information set in advance in accordance with one of the modes as setting information of display targets are displayed from the left side in the drawing. In FIG. 14, a copy mode icon is displayed as the mode icon, "14:30 July 20" is displayed as the job execution date and time, and setting information for three functions (paper selection, double-sided copying, and stapling) among setting information set in advance is displayed as display targets. Note that the setting information displayed in the detailed information display region R14 is preferably set in accordance with a job mode because different functions are set for the different job modes.

For example, FIG. 15 is a table in which setting information to be displayed in the detailed information display region R14 according to a job mode is summarized. Here, a mode represents a mode of a job, and display 1, display 2, and display 3 represent setting information displayed in the detailed information display region R14. The number of display items of the setting information is not limited to three of display 1, display 2, and display 3, and can be appropriately set according to a displayable region in the detailed information display region R14. When the number of displayable pieces of setting information is large, it is more advantageous to identify a job having similar setting information. Note that, when the number of pieces of setting information to be displayed is large and it is difficult to display the setting information at a time, for example, a display format of the detailed information display region R14 is set to a scroll format so that all the set setting information can be displayed.

Furthermore, instead of display of the setting information set in advance according to a mode of a job, only setting information changed from a default state may be displayed in the detailed information display region R14. Note that when all the pieces of setting information are desired to be displayed, the pieces of setting information changed from the default state may be collectively displayed from a first display position in the detailed information display region R14, and the pieces of setting information in the default state may be arranged and displayed in a posterior portion of the display position. Furthermore, some pieces of setting information may be displayed in a fixed manner, and the other pieces of setting information may be displayed by giving priority to only the pieces of setting information that have been changed from the default state.

In FIG. 15, display 1 "paper selection", display 2 "double-sided copying", and display 3 "stapling" are set for the mode "copy", display 1 "destination information" and display 2 "the number of destinations" are set for the mode "scan", and display 1 "destination information" and display 2 "the number of destinations" are set for the mode "fax" as setting information to be displayed in the detailed information display region R14. Note that, as illustrated in FIG. 14, the display of the individual pieces of setting information in the detailed information display region R14 may be performed by separating an icon representing the setting information and the content of the setting information by a slash.

Here, in FIG. 14 and so on, a display position (arrangement position) of the detailed information display region R14 is fixed in a lower portion below the history information display region R12. However, the display position of the detailed information display region R14 is not limited to the position illustrated in FIG. 14 and so on. For example, the detailed information display region R14 may be displayed so as to be superposed on the history information display region R12. In this case, in order to ensure the visibility of the setting history information (list region) displayed at the superposed position, it is preferable that the display position of the detailed information display region R14 is not fixed but movable. Furthermore, the detailed information display region R14 may be in a pop-up display format in which the detailed information display region R14 pops up in response to a selection of the setting history information, an accordion display format, or the like.

Moreover, the detailed information display region R14 may not be normally displayed, and the history information selection screens W20A and 20B may be provided with a display button "detailed information" for receiving an instruction for displaying the detailed information display region R14, and the detailed information display region R14 may be displayed when the display button "detailed information" is selected by the user.

Figure 16:
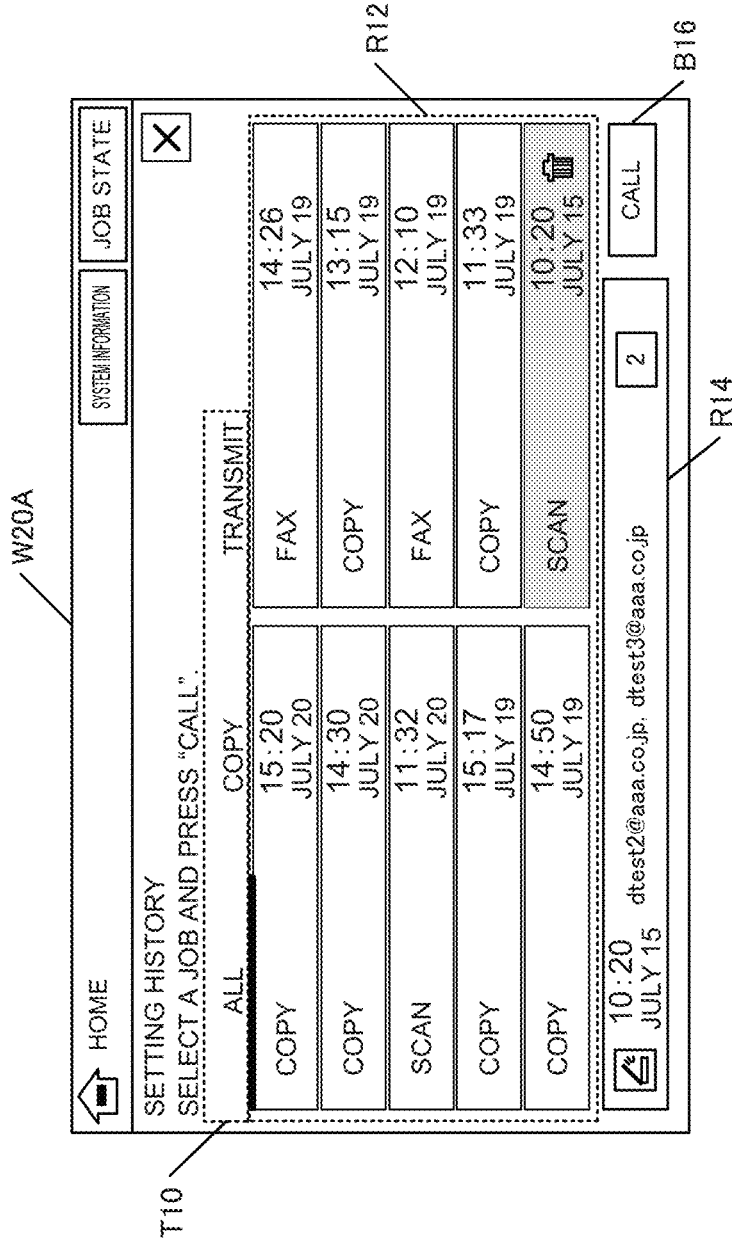
FIG. 16 is a diagram illustrating an operation example according to the first embodiment.

Next, FIG. 16 is a diagram illustrating a change in the display state when the user selects the tenth list region. Note that, in the following description, it is assumed that the tenth list region displays setting history information for a scan mode job. In FIG. 16, a scan mode icon is displayed as the mode icon, "10:20 July 15" is displayed as the job execution date and time, and setting information for two functions (destination information and the number of destinations) is displayed as setting information set in advance in the detailed information display region R14 in accordance with the selection of the tenth list region by the user. Note that, in FIG. 16, "dtest2@aaa.co.jp, dtest3@aaa.co.jp" is displayed as the destination information, and "2" is displayed as the number of destinations.

Figure 17:
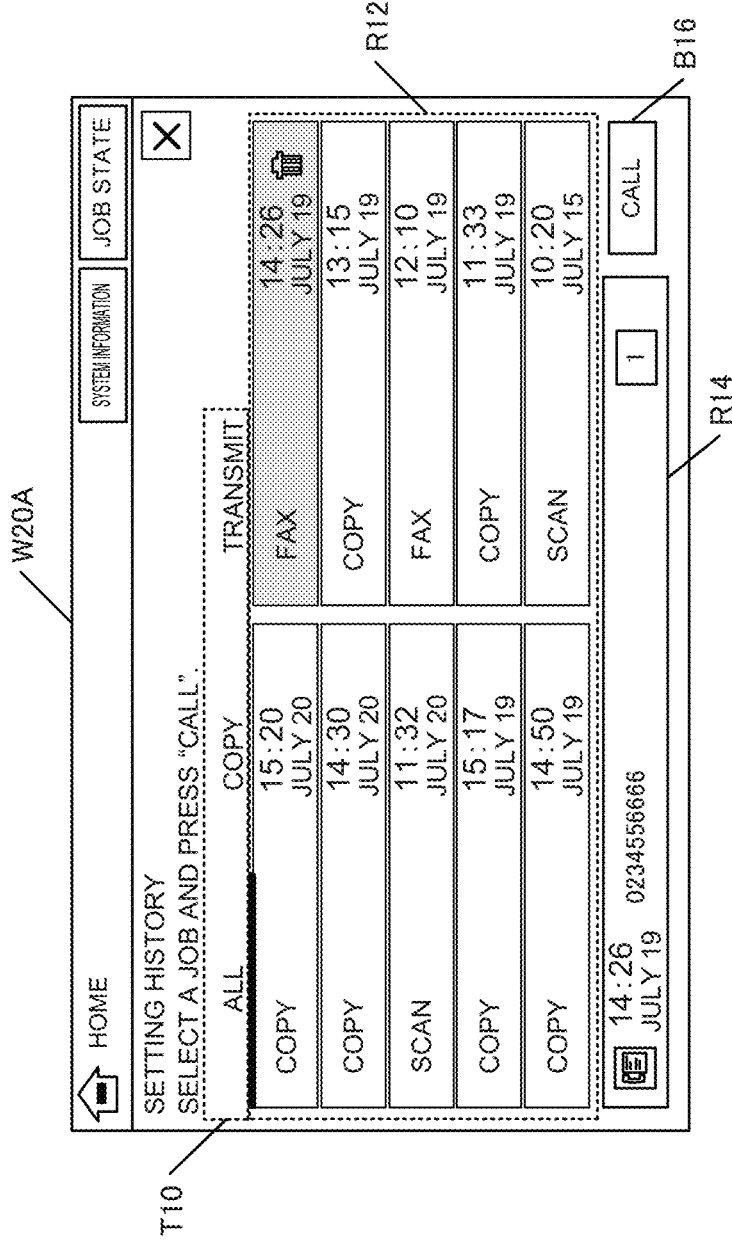
FIG. 17 is a diagram illustrating an operation example according to the first embodiment.

Furthermore, FIG. 17 is a diagram illustrating a change in the display state when the user selects the sixth list region. Note that, in the following description, it is assumed that the sixth list region displays setting history information for a fax mode job. In FIG. 17, a fax mode icon is displayed as the mode icon, "14:26 July 19" is displayed as the job execution date and time, and setting information for two functions (destination information and the number of destinations) is displayed as setting information set in advance in the detailed information display region R14 in accordance with the selection of the sixth list region by the user. In FIG. 17, "0234556666" is displayed as the destination information, and "1" is displayed as the number of destinations.

Figure 18:
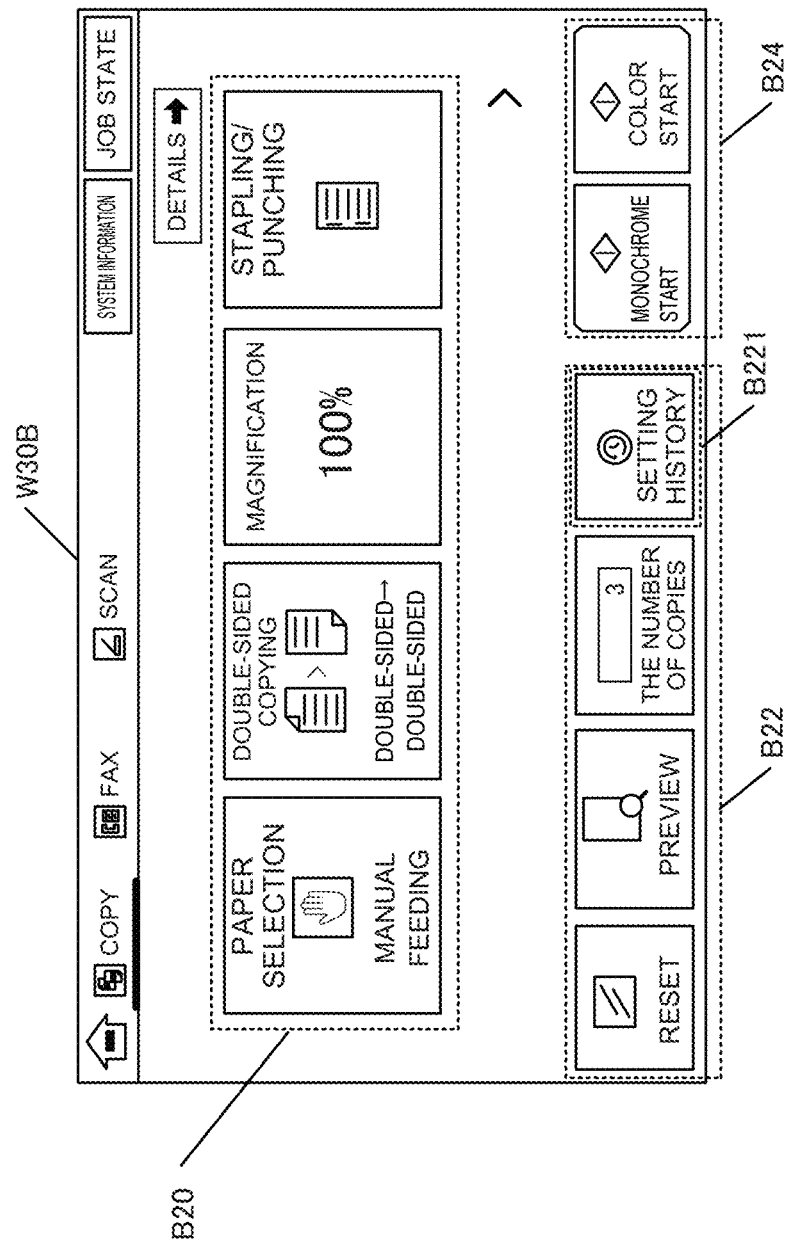
FIG. 18 is a diagram illustrating an operation example according to the first embodiment.

Next, FIG. 18 is a diagram illustrating a configuration example of a mode setting screen W30B for the copy mode displayed by the one or more processors 11 in response to an instruction for selecting the call button B16 issued by the user in the history information selection screen W20B of FIG. 14. The one or more processors 11 display a setting screen in which the setting information of the setting history information corresponding to the third list region selected by the user in FIG. 14 is employed as an execution condition of the copy mode job.

The setting screen W30B includes setting value buttons B20, operation control buttons B22, and start buttons B24.

The setting value buttons B20 receive a setting value selected and input by a user. In a case where the one or more processors 11 receive an instruction for selecting the call button B16 and display the setting screen W30B, when the setting value buttons B20 corresponding to the setting information corresponding to the selected setting history information are displayed on the setting screen W30B, the one or more processors 11 reflect and display the setting information on the setting value buttons B20 (front side). The user can confirm the setting information displayed on the setting value buttons B20. Note that, in FIG. 18, paper selection, double-sided copying, a magnification, and stapling/punching are displayed on the setting value buttons B20.

The operation control buttons B22 include, for example, a reset button, a preview button, a copy count button, and a setting history button B221. The reset button receives, for example, an instruction for resetting setting information selected and input via the setting value buttons B20, the copy count button, or the like. For example, the preview button receives an instruction for displaying a preview image prior to execution of a copy job. The copy count button receives an input of the number of copies. The setting history button B221 receives an instruction for displaying the history information selection screen W20B. When receiving an instruction for selecting the setting history button B221, the one or more processors 11 change the screen to the history information selection screen W20B illustrated in FIG. 13 or FIG. 14.

Note that, regarding the display of the history information selection screen, when a setting history button provided on the setting screen of each of the modes is selected, the history information selection screen may be displayed in a state in which a tab indicating the mode is selected. Specifically, when the setting history button provided on the setting screen for the copy mode is selected, the one or more processors 11 displays the history information selection screen in a state in which the copy tab is selected. When the setting history button provided on the setting screen for the scan mode or the fax mode is selected, the one or more processors 11 display the history information selection screen in a state in which the tab "transmit" is selected. The user can easily recognize a mode corresponding to the setting history information displayed on the history information selection screen by checking the tab also displayed on the history information selection screen.

The start buttons B24 include a monochrome start button and a color start button. When a monochrome copy is desired to be performed, the user selects the monochrome start button. When a color copy is desired to be performed, the user selects the color start button. When the user selects either the monochrome start button or the color start button, the one or more processors 11 executes processing related to the copy job.

In the first embodiment, the case where, when the screen transition to the history information selection screen W20B illustrated in FIG. 13 is performed, for example, by selecting the setting history button B12 on the home screen W10 illustrated in FIG. 11, the screen is displayed in a state in which none of the pieces of setting history information (list regions) is selected.

Figure 19:
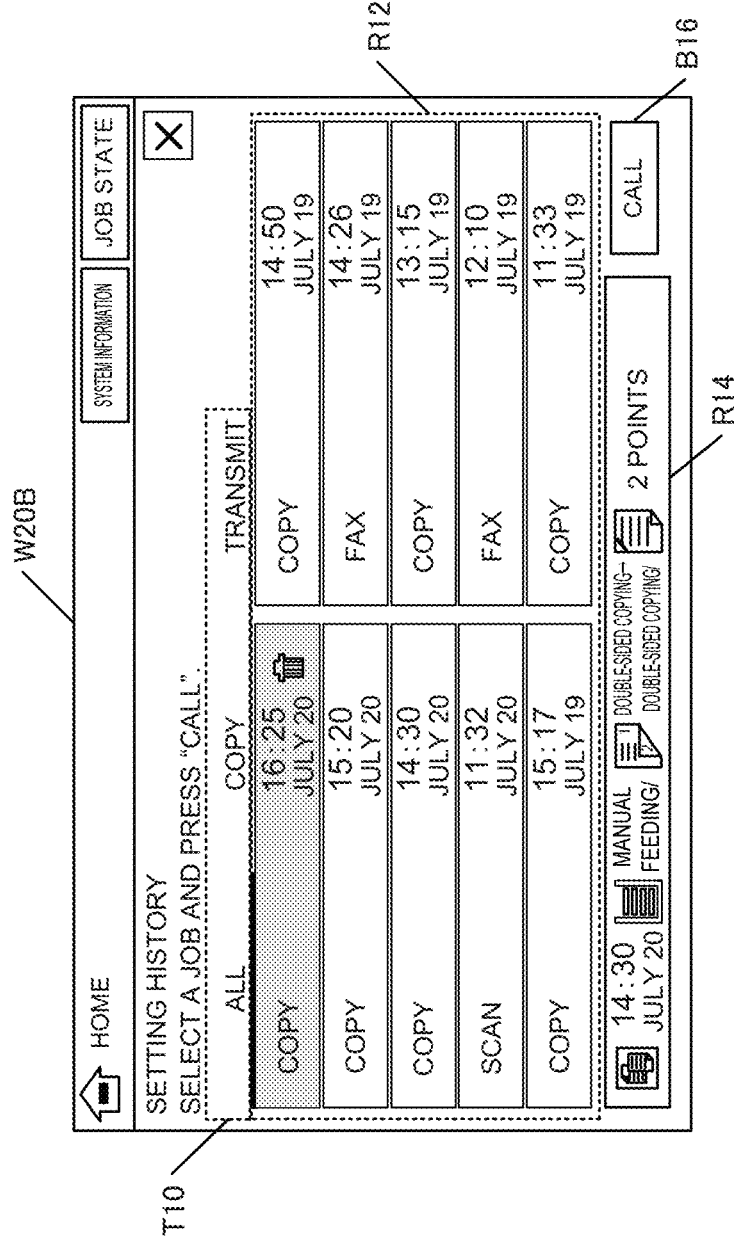
FIG. 19 is a diagram illustrating an operation example according to the first embodiment.

However, for example, as illustrated in FIG. 19, in a case where an instruction for selecting the setting history button B12 on the home screen W10 is received, it is also possible to perform screen transition to the history information selection screen W20B in a state in which the setting history information (first list region) corresponding to a latest job is selected from the beginning.

In general, it is considered that the setting history information is used to execute again setting history information for a latest job in many cases. Therefore, in an initial state of the history information selection screen, the setting history information for the latest job is selected and displayed from the beginning, so that the user can save a labor of a selection of desired setting history information. In this case, since the setting information corresponding to the already selected setting history information is also displayed in the detailed information display region R14, the user can immediately confirm contents of the setting history information. Then, by selecting the call button B16 on the history information selection screen W20B, the user can realize the reproduction of the job based on the setting history information of the latest job with the minimum operation.

As described above, according to the first embodiment, regarding the display of the setting history information via the home screen, the pieces of setting history information to be stored and managed can be displayed in a list. The pieces of setting history information are displayed in the list while the overlapping setting history information and the setting history information whose history is old and whose use frequency is estimated not to be so high are omitted, and accordingly, the user can use useful setting history information. Furthermore, since the setting information of the setting history information can be displayed by selecting desired setting history information from the pieces of setting history information displayed in the list, the user can easily confirm the contents of the selected setting history information. Moreover, since it is possible to directly display a mode setting screen in which the setting information corresponding to the selected setting history information is employed as the execution condition of the job, it is possible to improve the operability for the user with respect to the job execution instruction operation based on the setting history information.

2 Second Embodiment

A second embodiment relates to display of setting history information via a mode setting screen.

According to the first embodiment, the screen is changed to the history information selection screen via the home screen. According to the second embodiment, a mode setting screen corresponding to a mode of setting history information to be saved is changed to a history information selection screen, and only the setting history information corresponding to a saving target mode is displayed on the history information selection screen to further improve convenience.

Note that, since a functional configuration, a processing flow, and the like of a multifunction peripheral according to the second embodiment are substantially the same as those of the multifunction peripheral 10 according to the first embodiment, descriptions thereof are omitted.

Figure 20:
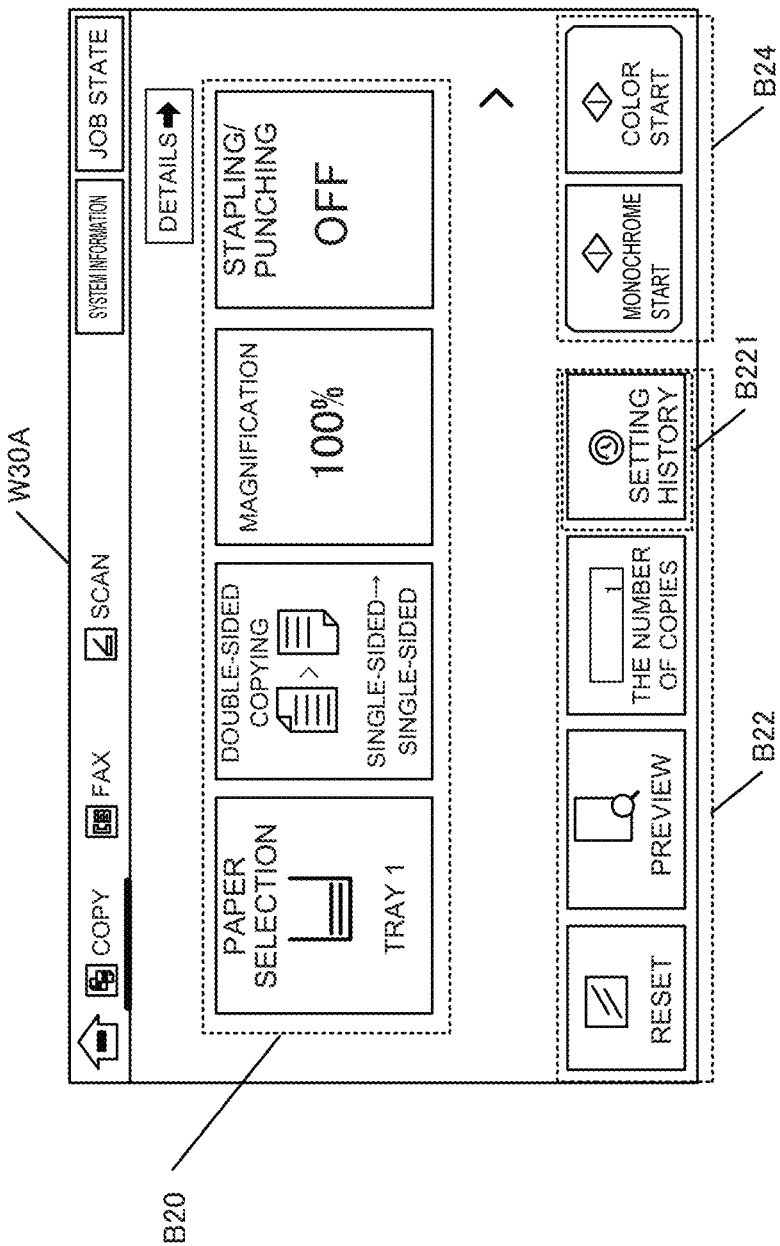
FIG. 20 is a diagram illustrating an operation example according to a second embodiment.

FIG. 20 is a diagram illustrating a configuration example of a mode setting screen W30A in a copy mode as a saving target mode of setting history information. Note that the copy mode setting screen W30A has the same configuration as the copy mode setting screen W30B described with reference to FIG. 18. It is assumed here that the mode setting screen W30A entered by selecting a mode selection button B10 (copy button) on the home screen W10 illustrated in FIG. 11 is determined as an initial screen of the copy mode.

Figure 21:
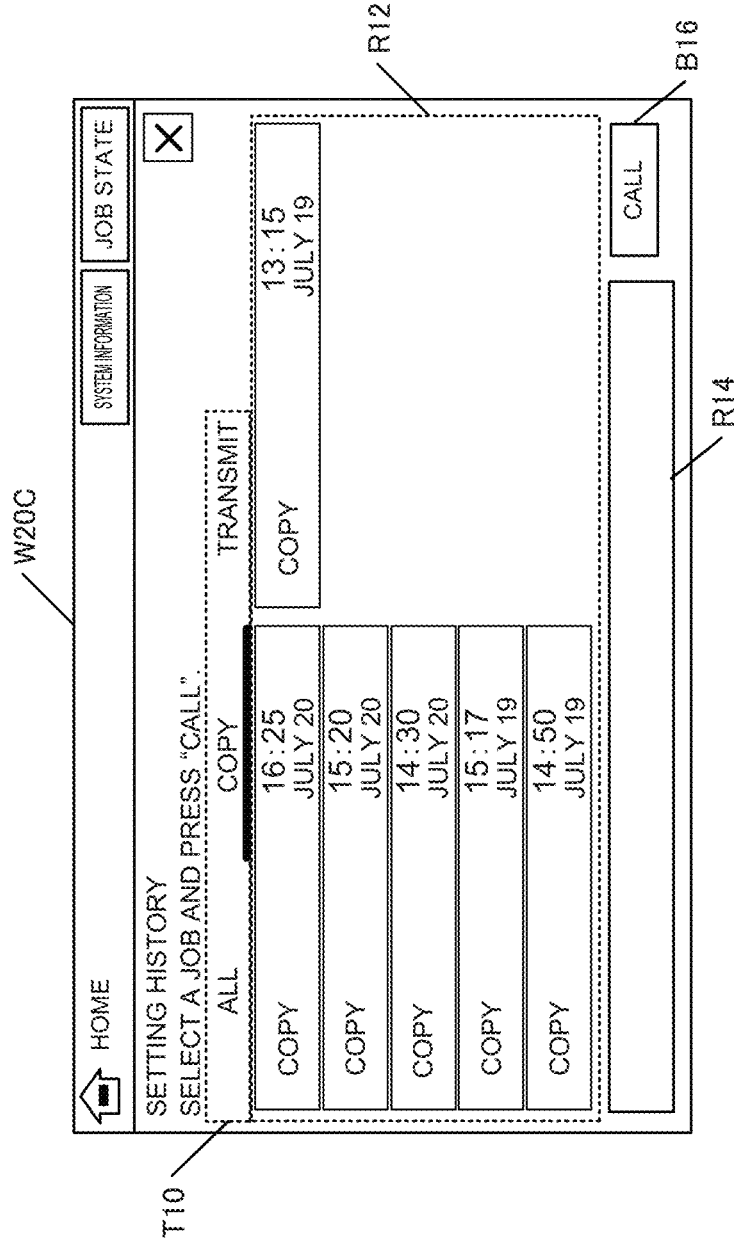
FIG. 21 is a diagram illustrating an operation example according to the second embodiment.

When the user selects a setting history button B221 on the mode setting screen W30A, the mode setting screen W30A is changed to a history information selection screen W20C illustrated in FIG. 21.

When a screen transition is made from the mode setting screen in which setting history information in the copy mode, such as the mode setting screen W30A, is to be saved to the history information selection screen, one or more processors 11 make restriction such that setting history information corresponding to the saving target mode is displayed on the history information selection screen. That is, as illustrated in FIG. 21, only the setting history information corresponding to the copy mode is displayed in the history information display region R12 in the history information selection screen W20C.

At this time, since the setting history information displayed in the history information display region R12 is only the setting history information corresponding to the copy mode, a tab "copy" is selected from display mode selection tabs T10.

Figure 22:
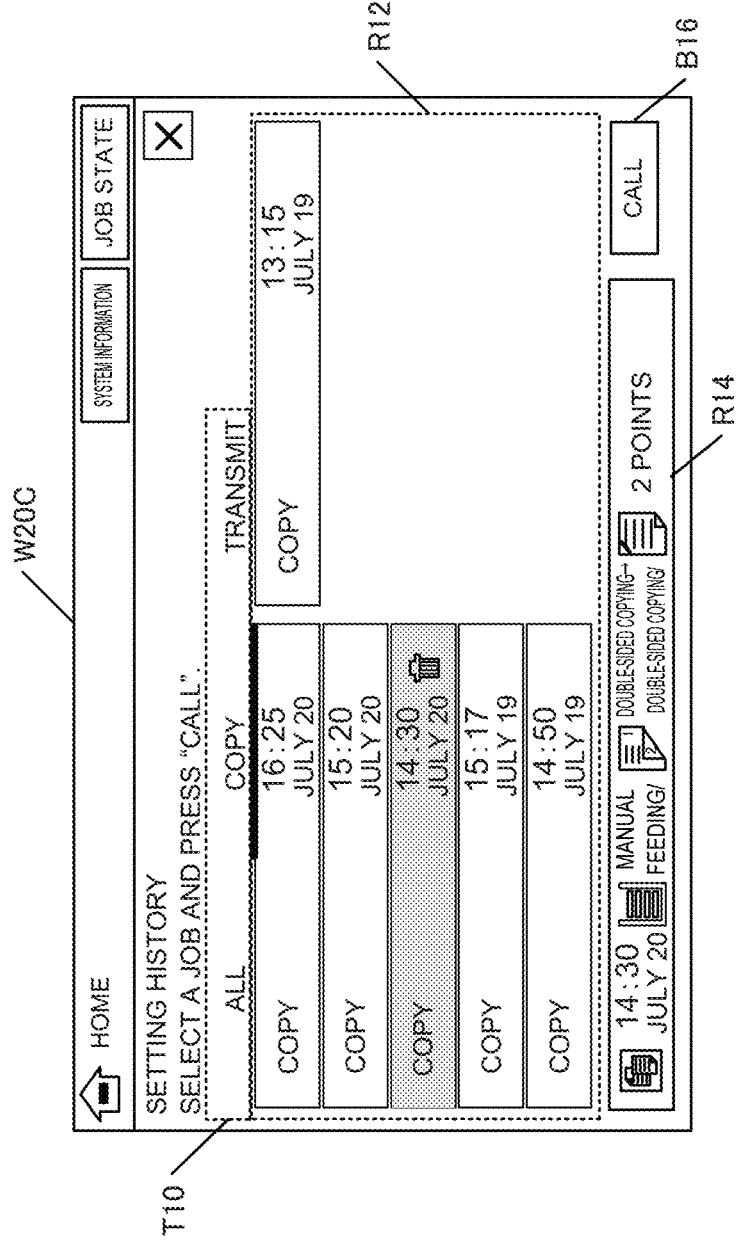
FIG. 22 is a diagram illustrating an operation example according to the second embodiment.
Figure 23:
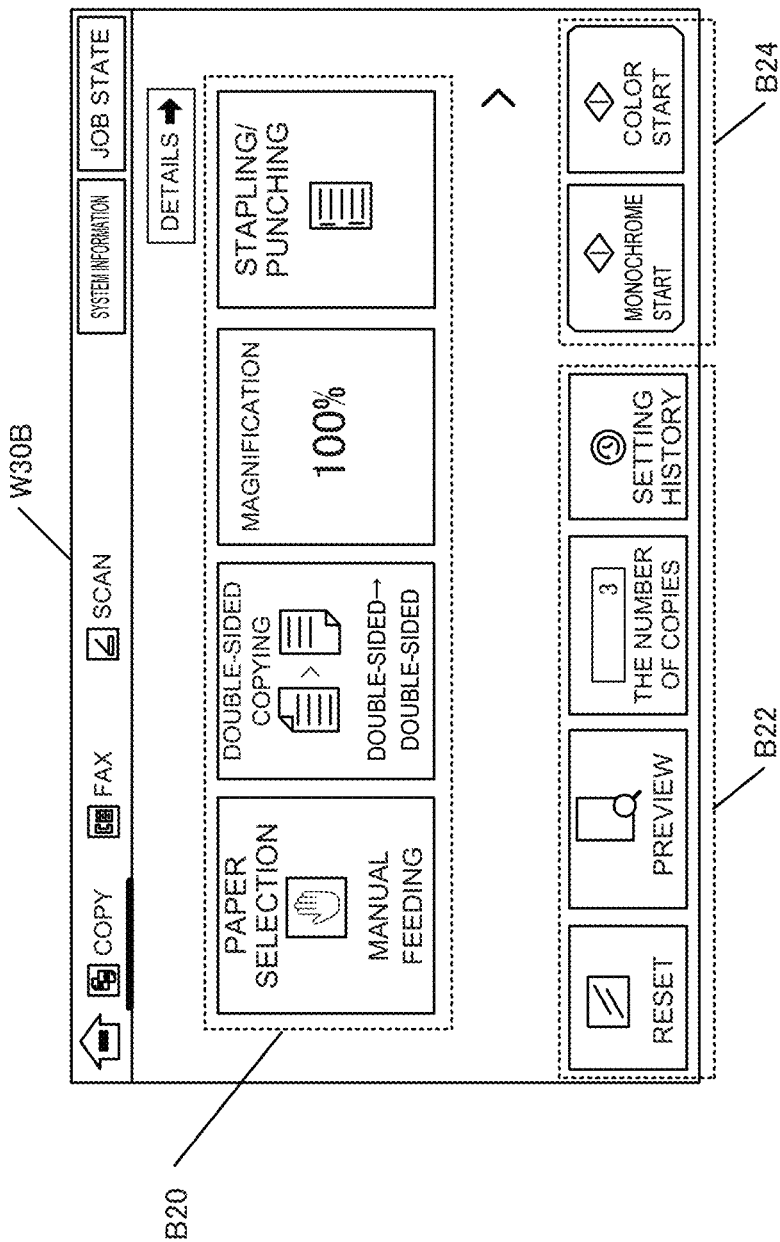
FIG. 23 is a diagram illustrating an operation example according to the second embodiment.

Then, as shown in FIG. 22, when setting history information displayed in a third list region is selected in the history information display region R12 of the history information selection screen W20C and an instruction for selecting a call button B16 is received, the one or more processors 11 display a copy mode setting screen W30B in which setting information corresponding to the setting history information is employed as an execution condition of a copy mode job (FIG. 23).

As described above, according to the second embodiment, in addition to the effect according to the first embodiment, regarding the display of the setting history information via the mode setting screen, it is possible to further reduce the time and effort regarding the selection of the setting history information by displaying only the setting history information corresponding to the mode.

3 Third Embodiment

A third embodiment relates to display of setting history information executed by an authenticated user.

The third embodiment relates to display of setting history information via a home screen or a mode setting screen, and a form in which only setting history information corresponding to a job executed by the authenticated user is displayed will be described.

Note that a functional configuration, a processing flow, and the like of a multifunction peripheral according to the third embodiment are substantially the same as those of the multifunction peripheral 10 according to the first embodiment. Therefore, different points will be described.

According to the third embodiment, in a process of updating a setting history management table 2371 (refer to FIG. 7), a process of performing an authentication process of a user who attempts to log into a multifunction peripheral 10 which is performed by one or more processors 11 is added at any timing before the process of calling the stored setting history information in step S16.

Specifically, when the user authentication is successfully performed, the one or more processors 11 read only setting history information generated for a job executed by the authenticated user from a setting history management table 2371 in the process of calling the stored setting history information in step S16.

Then, the one or more processors 11 perform an update process after step S18 and a process of displaying the setting history information on the setting history information of the authenticated user read in step S16.

Figure 24:
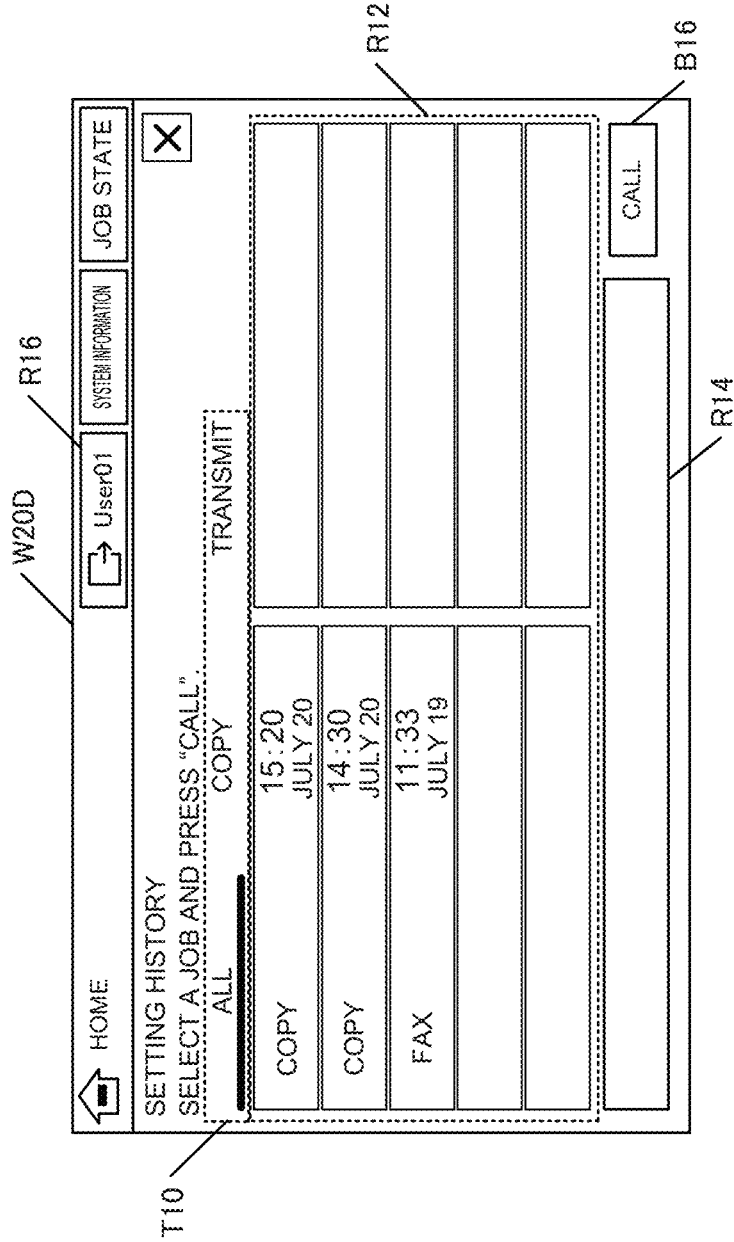
FIG. 24 is a diagram illustrating an operation example according to a third embodiment.

FIG. 24 is a diagram illustrating an example of a configuration of a history information selection screen W20D according to the third embodiment. The history information selection screen W20D illustrated in FIG. 24 may have the same configuration as the history information selection screens W20A to W20C described in the first and second embodiments and the like, but is different in that an authenticated user display region R16 is further provided.

An authenticated user display region R16 displays a user name of an authenticated user who has been logged in to the multifunction peripheral 10. According to an example of FIG. 24, an authenticated user "User01" has been logged into the multifunction peripheral 10.

In the history information display region R12, only setting history information (first to third list regions) corresponding to a job executed by the authenticated user "User01" is displayed.

As described above, according to the third embodiment, in addition to the effects according to the first and second embodiments, since only setting history information corresponding to a job executed by the authenticated user is displayed, operability for selection of the setting history information by the authenticated user can be further enhanced.

Note that, according to the first to third embodiments, display sizes and the display fonts of the history information display region and the list regions in the display of the individual pieces of setting history information in the history information selection screen are fixed. In addition, sizes of display of the history information display region and the list regions may be dynamically adjusted in accordance with the number of pieces of setting history information to be stored and a screen configuration. For example, in a case of change in a display region size, such as a size expansion or a size reduction of a screen (window), the display sizes of the history information display region and the list regions may be dynamically adjusted in accordance with the change in the display region size.

The present disclosure is not limited to any of the embodiments described above, and various modifications may be made. That is, the technical scope of the present disclosure also includes embodiments that may be obtained by combining technical measures that are modified as appropriate without departing from the gist of the present disclosure.

In addition, the above-described embodiments have parts that are described separately for convenience of the description. However, it is needless to say that the embodiments may be combined and implemented within the technically possible range.

In addition, the program that operates in each device in the embodiments is a program that controls a CPU or the like (a program that causes a computer to function) in a manner to realize the functions of the above embodiments. The information handled by the devices is temporarily accumulated in a temporary storage device (for example, a RAM) during processing of the information, and then, is stored in various storage devices, such as a read-only memory (ROM) and an HDD, and is read, modified, and written by the CPU as necessary.

A recording medium used for storing the program may be any one of a semiconductor medium (for example, a ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray (registered trademark) disc (BD), or the like), and a magnetic recording medium (for example, a magnetic tape, a flexible disk, or the like). Furthermore, the functions of the present disclosure may also be realized not only by executing the loaded programs but also processing in cooperation with the operating system, other application programs, or the like in accordance with the instructions of the programs.

Furthermore, in the case of distribution to the market, the program can be stored and distributed in a portable recording medium, or transferred to a server computer connected via a network such as the Internet. In this case, a storage device of the server computer is, as a matter of course, included in the present disclosure.

What is claimed is:

1. A display device, comprising:
one or more processors;
one or more memories that store setting information of an executed job as setting history information under control of the one or more processors; and
a display, wherein
the one or more processors display in the display
a first display region for displaying a list of setting history information stored in the one or more memories,
a second display region for displaying the setting information based on the setting history information selected by a user from the list display, and
a reception button for receiving an instruction to display a setting screen of a job in which the setting information based on the setting history information selected by the user is employed.

2. The display device according to claim 1, wherein
an upper limit number is provided for the number of pieces of setting history information to be stored in the one or more memories, and
the one or more processors store the setting history information in the one or more memories until the number of pieces of stored setting history information reaches the upper limit number, and display all the stored setting history information in the first display region as a list.

3. The display device according to claim 2, wherein the upper limit number is a total number of the pieces of setting history information generated for each mode.

4. The display device according to claim 3, wherein the one or more processors perform control to display a list of the pieces of setting history information belonging to the same mode on the display.

5. The display device according to claim 1, wherein, when setting information that is the same as setting information of a newly executed job is already stored in association with history information, the one or more processors restrict storage of the same setting information.

6. The display device according to claim 5, wherein the one or more processors restrict storage of the setting history information of a newly executed job by updating a storage date and time of the stored setting history information to an execution date and time of the newly executed job.

7. The display device according to claim 2, wherein, when the number of pieces of stored setting history information reaches the upper limit number, the one or more processors delete the setting history information having an oldest date and time of storage from the one or more memories.

8. The display device according to claim 1, further comprising:
an authenticator that authenticates a user, wherein
the one or more processors store the setting information of a job executed for each authenticated user in association with the history information.

9. The display device according to claim 1, wherein the one or more processors display preset information among information included in the setting information in the second display region.

10. The display device according to claim 9, wherein the second display region is included in a display region different from the first display region.

11. A method for controlling a display device having a display, comprising:
storing setting information of an executed job as setting history information; and
displaying the stored setting history information in a first display region in the display as a list;
displaying the setting information based on the setting history information selected by a user from the list display, in a second display region in the display; and
displaying, in the display, a reception button for receiving an instruction to display a setting screen of a job in which the setting information based on the setting history information selected by the user is employed.

* * * * *